United States Patent
Yanami et al.

(10) Patent No.: US 9,614,401 B2
(45) Date of Patent: Apr. 4, 2017

(54) CONTROL METHOD, CONTROL SERVER, AND COMPUTER-READABLE RECORDING MEDIUM

(71) Applicants: FUJITSU LIMITED, Kawasaki-shi, Kanagawa (JP); The University of Tokyo, Tokyo (JP)

(72) Inventors: Hitoshi Yanami, Kawasaki (JP); Hidenao Iwane, Kawasaki (JP); Tomotake Sasaki, Kawasaki (JP); Hirokazu Anai, Hachioji (JP); Junji Kaneko, Mishima (JP); Shinji Hara, Tokyo (JP); Suguru Fujita, Tokyo (JP)

(73) Assignees: FUJITSU LIMITED, Kawasaki (JP); THE UNIVERSITY OF TOKYO, Tokyo (JP)

( * ) Notice: Subject to any disclaimer, the term of this patent is extended or adjusted under 35 U.S.C. 154(b) by 518 days.

(21) Appl. No.: 14/193,694

(22) Filed: Feb. 28, 2014

(65) Prior Publication Data
US 2014/0249793 A1    Sep. 4, 2014

(30) Foreign Application Priority Data
Mar. 4, 2013    (JP) .................. 2013-042074

(51) Int. Cl.
*G06F 17/50*    (2006.01)
*H02J 13/00*    (2006.01)
(Continued)

(52) U.S. Cl.
CPC ............. *H02J 13/0003* (2013.01); *H02J 3/00* (2013.01); *H02J 7/0013* (2013.01); *H02J 2003/002* (2013.01)

(58) Field of Classification Search
CPC ....... H02J 7/025; H02J 7/052; G01R 31/3648; G01R 31/3613; G04G 19/08; G06F 1/18; G06F 1/3203; A61B 1/00034
See application file for complete search history.

(56) References Cited

U.S. PATENT DOCUMENTS

| 2002/0043959 A1* | 4/2002 | Tanaka | G06F 1/18 320/116 |
| 2002/0171400 A1* | 11/2002 | Koyama | G04G 19/08 320/135 |

(Continued)

FOREIGN PATENT DOCUMENTS

| JP | 2011-114945 | 6/2011 |
| JP | 2011-254617 | 12/2011 |
| JP | 2012-161202 | 8/2012 |

OTHER PUBLICATIONS

Japanese Office Action dated Apr. 26, 2016 in corresponding Japanese Patent Application No. 2013-042074.

*Primary Examiner* — Kandasamy Thangavelu
(74) *Attorney, Agent, or Firm* — Staas & Halsey LLP

(57) ABSTRACT

A control server according to an embodiment sorts a plurality of notebook PCs into a plurality of groups so that the total value of the remaining energy is a value similar to the total value of the remaining energy of the rechargeable batteries of a plurality of notebook PCs included in a different group. The control server according to the embodiment performs local search individually on the sorted groups, and generates a control plan for the individual notebook PCs.

15 Claims, 21 Drawing Sheets

(51) Int. Cl.
*H02J 3/00* (2006.01)
*H02J 7/00* (2006.01)

(56) References Cited

U.S. PATENT DOCUMENTS

| | | | |
|---|---|---|---|
| 2003/0137277 A1* | 7/2003 | Mori | G01R 31/3648 320/132 |
| 2004/0104706 A1* | 6/2004 | Ooi | G01R 31/3613 320/132 |
| 2006/0114267 A1* | 6/2006 | Park | G06F 1/3203 345/619 |
| 2013/0072757 A1* | 3/2013 | Mcgrath | A61B 1/00034 600/188 |
| 2013/0169231 A1* | 7/2013 | Hotta | H02J 7/0052 320/118 |
| 2014/0266037 A1* | 9/2014 | Akiyoshi | H02J 7/025 320/108 |

* cited by examiner

| ID | OBSERVABLE OR UNOBSERVABLE | CONTROLLABLE OR UNCONTROLLABLE | STATE | BATTERY CAPACITY [Wh] | CHARGING RATE [%] |
|---|---|---|---|---|---|
| PC1 | ○ | ○ | AC | 65 | 80 |
| PC2 | ○ | ○ | CH | 60 | 50 |
| PC3 | × | − | − | 70 | − |
| PC4 | ○ | × | BA | 60 | 30 |
| ⋮ | ⋮ | ⋮ | ⋮ | ⋮ | ⋮ |

FIG.8

| ID | 9:00 | 9:30 | 10:00 | 10:30 | 11:00 | 11:30 | 12:00 | 12:30 | 13:00 | |
|---|---|---|---|---|---|---|---|---|---|---|
| PC1 | AC | AC | AC | AC | AC | CH | CH | BA | BA | ... |
| PC2 | AC | BA | AC | AC | AC | AC | AC | AC | AC | |
| ⋮ | ⋮ | ⋮ | ⋮ | ⋮ | ⋮ | ⋮ | ⋮ | ⋮ | ⋮ | |

125

| GROUP IDENTIFICATION INFORMATION | ID GROUP |
|---|---|
| GROUP 2A | PC8, PC24, PC7, PC6 |
| GROUP 2B | PC12, PC15, PC4, PC11 |
| GROUP 2C | PC5, PC10, PC9, PC3 |
| GROUP 2D | PC7, PC23, PC2, PC1 |
| GROUP 2E | PC19, PC16, PC20, PC18 |
| GROUP 2F | PC13, PC21, PC14, PC22 |

FIG.12

| ID | 9:00 | 9:30 | 10:00 | 10:30 | 11:00 | 11:30 | 12:00 | 12:30 | 13:00 |
|---|---|---|---|---|---|---|---|---|---|
| PC8 | AC | AC | AC | AC | AC | AC | AC | AC | AC |
| PC24 | AC | AC | AC | AC | AC | AC | AC | AC | AC |
| PC7 | UN1 | UN1 | UN1 | UN1 | UN1 | UN1 | UN1 | UN1 | UN1 |
| PC6 | UN2 | UN2 | UN2 | UN2 | UN2 | UN2 | UN2 | UN2 | UN2 |

| ID | 9:00 | 9:30 | 10:00 | 10:30 | 11:00 | 11:30 | 12:00 | 12:30 | 13:00 |
|---|---|---|---|---|---|---|---|---|---|
| PC8 | AC | AC | AC | AC | AC | AC | AC | AC | AC |
| PC24 | AC | AC | AC | AC | AC | AC | AC | AC | AC |
| PC7 | UN1 | UN1 | UN1 | UN1 | UN1 | UN1 | UN1 | UN1 | UN1 |
| PC6 | UN2 | UN2 | UN2 | UN2 | UN2 | UN2 | UN2 | UN2 | UN2 |

↓

(2)

| ID | 9:00 | 9:30 | 10:00 | 10:30 | 11:00 | 11:30 | 12:00 | 12:30 | 13:00 |
|---|---|---|---|---|---|---|---|---|---|
| PC8 | AC | AC | AC | AC | AC | AC | AC | AC | AC |
| PC24 | AC | BA | BA | BA | BA | BA | BA | BA | BA |
| PC7 | UN1 | UN1 | UN1 | UN1 | UN1 | UN1 | UN1 | UN1 | UN1 |
| PC6 | UN2 | UN2 | UN2 | UN2 | UN2 | UN2 | UN2 | UN2 | UN2 |

| ID | 9:00 | 9:30 | 10:00 | 10:30 | 11:00 | 11:30 | 12:00 | 12:30 | 13:00 |
|---|---|---|---|---|---|---|---|---|---|
| PC8 | AC | AC | AC | AC | AC | AC | AC | BA | BA |
| PC24 | AC | AC | AC | AC | AC | AC | AC | AC | AC |
| PC7 | UN1 | UN1 | UN1 | UN1 | UN1 | UN1 | UN1 | UN1 | UN1 |
| PC6 | UN2 | UN2 | UN2 | UN2 | UN2 | UN2 | UN2 | UN2 | UN2 |

↓

(2)

| ID | 9:00 | 9:30 | 10:00 | 10:30 | 11:00 | 11:30 | 12:00 | 12:30 | 13:00 |
|---|---|---|---|---|---|---|---|---|---|
| PC8 | AC | AC | AC | AC | AC | CH | CH | BA | BA |
| PC24 | AC | AC | AC | AC | AC | AC | AC | AC | AC |
| PC7 | UN1 | UN1 | UN1 | UN1 | UN1 | UN1 | UN1 | UN1 | UN1 |
| PC6 | UN2 | UN2 | UN2 | UN2 | UN2 | UN2 | UN2 | UN2 | UN2 |

FIG.20

| GROUP ID | 9:00 | 9:30 | 10:00 | 10:30 | 11:00 | 11:30 | 12:00 | 12:30 | 13:00 | |
|---|---|---|---|---|---|---|---|---|---|---|
| GROUP 3A | AC | AC | AC | AC | AC | CH | CH | BA | BA | ... |
| GROUP 3B | AC | BA | AC | AC | AC | AC | AC | AC | AC | |
| ⋮ | ⋮ | ⋮ | ⋮ | ⋮ | ⋮ | ⋮ | ⋮ | ⋮ | ⋮ | |

| GROUP IDENTIFICATION INFORMATION | ID GROUP |
|---|---|
| GROUP 3A | PC17, PC8, PC12, PC5 |
| GROUP 3B | PC16, PC19, PC13, PC21 |
| GROUP 3C | PC23, PC10, PC15, PC24 |
| GROUP 3D | PC2, PC9, PC4, PC7 |
| GROUP 3E | PC20, PC14, PC22, PC18 |
| GROUP 3F | PC1, PC3, PC11, PC6 |

FIG.23

| GROUP ID | 9:00 | 9:30 | 10:00 | 10:30 | 11:00 | 11:30 | 12:00 | 12:30 | 13:00 |
|---|---|---|---|---|---|---|---|---|---|
| GROUP 3A | AC | AC | AC | AC | AC | AC | AC | AC | AC |
| GROUP 3B | AC | AC | AC | AC | AC | AC | AC | AC | AC |
| ⋮ | ⋮ | ⋮ | ⋮ | ⋮ | ⋮ | ⋮ | ⋮ | ⋮ | ⋮ |

(1)

| GROUP ID | 9:00 | 9:30 | 10:00 | 10:30 | 11:00 | 11:30 | 12:00 | 12:30 | 13:00 |
|---|---|---|---|---|---|---|---|---|---|
| GROUP 3A | AC | AC | AC | AC | AC | AC | AC | AC | AC |
| GROUP 3B | AC | AC | AC | AC | AC | AC | AC | AC | AC |
| ⋮ | ⋮ | ⋮ | ⋮ | ⋮ | ⋮ | ⋮ | ⋮ | ⋮ | ⋮ |

(2)

| GROUP ID | 9:00 | 9:30 | 10:00 | 10:30 | 11:00 | 11:30 | 12:00 | 12:30 | 13:00 |
|---|---|---|---|---|---|---|---|---|---|
| GROUP 3A | AC | AC | AC | AC | AC | AC | AC | AC | AC |
| GROUP 3B | AC | BA | BA | BA | BA | BA | BA | BA | BA |
| ⋮ | ⋮ | ⋮ | ⋮ | ⋮ | ⋮ | ⋮ | ⋮ | ⋮ | ⋮ |

(1)

| GROUP ID | 9:00 | 9:30 | 10:00 | 10:30 | 11:00 | 11:30 | 12:00 | 12:30 | 13:00 |
|---|---|---|---|---|---|---|---|---|---|
| GROUP 3A | AC | AC | AC | AC | AC | AC | AC | BA | BA |
| GROUP 3B | AC | AC | AC | AC | AC | AC | AC | AC | AC |
| ⋮ | ⋮ | ⋮ | ⋮ | ⋮ | ⋮ | ⋮ | ⋮ | ⋮ | ⋮ |

(2)

| GROUP ID | 9:00 | 9:30 | 10:00 | 10:30 | 11:00 | 11:30 | 12:00 | 12:30 | 13:00 |
|---|---|---|---|---|---|---|---|---|---|
| GROUP 3A | AC | AC | AC | AC | AC | CH | CH | BA | BA |
| GROUP 3B | AC | AC | AC | AC | AC | AC | AC | AC | AC |
| ⋮ | ⋮ | ⋮ | ⋮ | ⋮ | ⋮ | ⋮ | ⋮ | ⋮ | ⋮ |

CONTROL METHOD, CONTROL SERVER, AND COMPUTER-READABLE RECORDING MEDIUM

CROSS-REFERENCE TO RELATED APPLICATION(S)

This application is based upon and claims the benefit of priority of the prior Japanese Patent Application No. 2013-042074, filed on Mar. 4, 2013, the entire contents of which are incorporated herein by reference.

FIELD

The embodiments discussed herein are related to a control method, for example.

BACKGROUND

In these years, because of electric power supply instability, for example, due to the Great East Japan Earthquake, companies are demanded to suppress the peak electric power at which an electric power demand takes the maximum value. For example, for previously existing techniques that suppress the peak electric power, there is a technique that uses the batteries of a plurality of notebook PCs (Personal Computers) in a company. The previously existing technique predicts the electric power demand curve and the data of the remaining energy of notebook PC batteries using information such as changes in power consumption and weather forecast in the past, and creates plans of charging and discharging the notebook PC batteries based on the demand curve. The previously existing technique then controls the notebook PC drive mode to switch between battery drive, AC (Alternate Current) drive, and charging batteries under AC drive via a network based on the charging and discharging plans. There related-art example are described, for example, in Japanese Laid-open Patent Publication No. 2012-161202 and Japanese Laid-open Patent Publication No. 2011-254617.

However, the foregoing previously existing technique has a problem in that it is difficult to create charging and discharging plans in a short processing time.

For example, in the case of a large system, the large system performs enormous processes when charging and discharging plans are created for all of notebook PC batteries in a company for individual time zones and optimum charging and discharging plans are created after simulation.

SUMMARY

According to an aspect of an embodiment, a control method includes sorting a plurality of devices into a plurality of groups based on remaining energy of rechargeable batteries included in the plurality of devices the plurality of groups being virtual hierarchical structure; generating a virtual control plan for the plurality of groups, by changing a part of state in a control plan which specifies a state of each device for each time zone, the state indicating whether the device charges or discharges individual rechargeable battery simulating an electric power demand for the each time zone using the virtual control plan, for the individual group; updating the control plan to the virtual control plan when a simulated result is improved more than a simulated result of the control plan, for the plurality of groups; outputting the control plan when a termination condition whether a predetermined time elapses is satisfied; and updating the control plan repeatedly until the termination condition is satisfied when the termination condition is not satisfied.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram of an exemplary control plan table;

FIG. 12 is a diagram (1) illustrative of processes performed by a generating unit according to the first embodiment;

FIG. 13 is a diagram (2) illustrative of processes performed by the generating unit according to the first embodiment;

FIG. 14 is a diagram (3) illustrative of processes performed by the generating unit according to the first embodiment;

FIG. 20 is a diagram of an exemplary first control plan table;

FIG. 22 is a diagram of an exemplary sorted result according to the second embodiment;

FIG. 23 is a diagram (1) illustrative of processes performed by a generating unit according to the second embodiment;

DESCRIPTION OF EMBODIMENTS

Preferred embodiments of the present invention will be explained with reference to accompanying drawings.

It is noted that the present invention is not limited by the embodiments.

[a] First Embodiment

Figure 1:
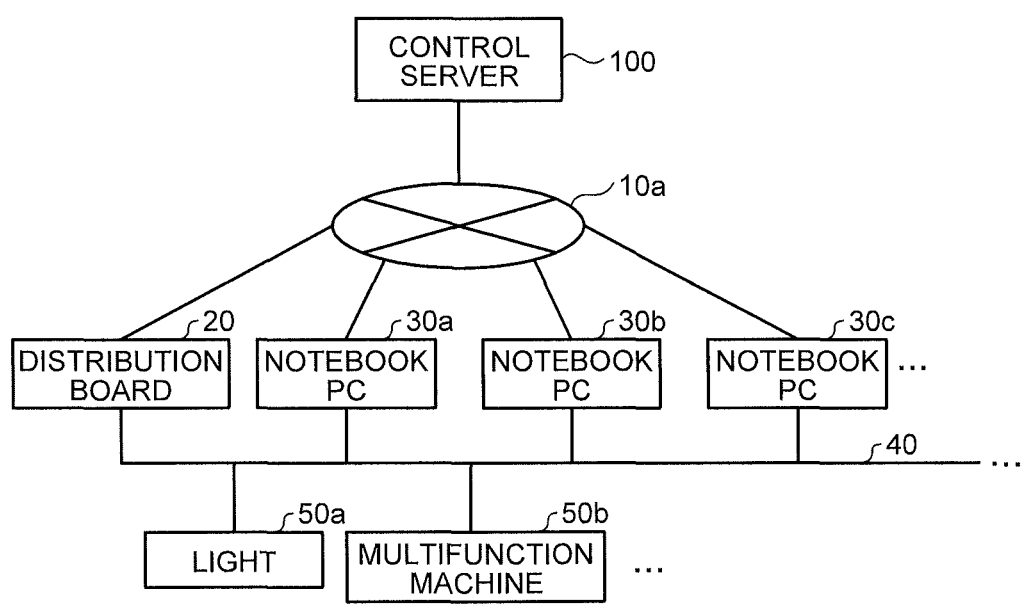
FIG. 1 is a diagram of the configuration of a system according to a first embodiment.

The configuration of a system according to a first embodiment will be described. FIG. 1 is a diagram of the configuration of the system according to the first embodiment. As illustrated in FIG. 1, this system includes a distribution board 20, notebook PCs (Personal Computers) 30a, 30b, and 30c, a light 50a, a multifunction machine 50b, and a control server 100. The distribution board 20, the notebook PCs 30a, 30b, and 30c, and the control server 100 are connected to each other via a network 10a. Moreover, the distribution board 20, the notebook PCs 30a, 30b, and 30c, the light 50a, and the multifunction machine 50b are connected to a power supply line 40.

The network 10a corresponds to an in-house LAN (Local Area Network), for example. For the in-house LAN, a given type of communication network such as a cable LAN and a wireless LAN is adopted. The in-house LAN may be connected to other networks such as the Internet and LANs.

In the example illustrated in FIG. 1, the case is illustrated where the notebook PCs 30a, 30b, and 30c are connected to the control server 100. However, the case is not limited to the illustrated configuration. For example, a given number of notebook PCs may be connected to the control server 100.

In the example illustrated in FIG. 1, the case is shown where the notebook PCs 30a, 30b, and 30c, the light 50a, and the multifunction machine 50b are connected to the power supply line 40. However, the case is not limited to the illustrated configuration. In other words, a given electrical appliance may be connected to the power supply line 40. For example, electrical appliances such as a television set, a refrigerator, and a microwave oven are connected to the power supply line 40. Moreover in the following, in the case where the light 50a, the multifunction machine 50b, and other electrical appliances are generically named with no discrimination, they are described as electrical appliances 50. The electrical appliances 50 include all the products that consume electric power in a company, for example.

The control server 100 is a server apparatus installed in the company, and generates a control plan that specifies charging and discharging the batteries of a plurality of notebook PCs.

The distribution board 20 supplies electric power to the notebook PCs 30a, 30b, and 30c, the light 50a, and the multifunction machine 50b through the power supply line 40.

The notebook PCs 30a, 30b, and 30c are notebook personal computers used by users in the company. In the following description, the notebook PCs 30a, 30b, and 30c are appropriately described as "the notebook PCs 30" or simply "PCs".

On the notebook PC 30, a client application is installed to control charging and discharging a rechargeable battery mounted on the notebook PC 30. For example, the notebook PC 30 receives, from the control server 100, a control plan that specifies the states related to charging and discharging the rechargeable battery of the notebook PC 30, and switches the states related to charging and discharging the rechargeable battery of the notebook PC 30 according to the received control policy. Moreover, the notebook PC 30 is an example of a device. Furthermore, the rechargeable battery of the notebook PC is also appropriately described as "the battery".

Figure 2:
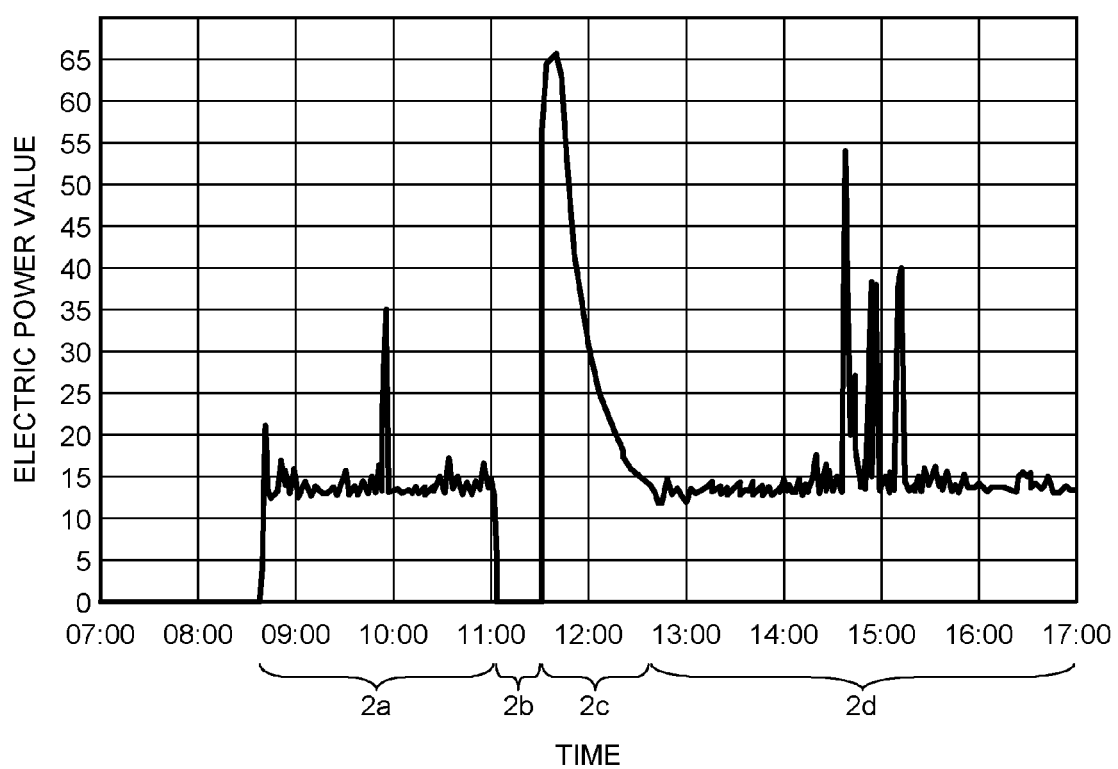
FIG. 2 is a diagram illustrative of states related to charging and discharging the rechargeable batteries of notebook PCs.

Here, the states related to charging and discharging the rechargeable battery of the notebook PC 30 will be described. FIG. 2 is a diagram illustrative of states related to charging and discharging the rechargeable batteries of the notebook PCs. In FIG. 2, the horizontal axis expresses time, and the vertical axis expresses an electric power value (W). For example, time zones 2a and 2d express the state in which the rechargeable battery is not charged or discharged and the notebook PC 30 operates at AC (Alternating Current) power. This state is also described as the state "AC". Moreover, for example, a time zone 2b expresses the state in which the notebook PC 30 operates by discharging the rechargeable battery. This state is also described as the state "BA". Furthermore, for example, a time zone 2c expresses the state in which the notebook PC 30 operates at AC power while the rechargeable battery is being charged. This state is also described as the state "CH". As illustrated in FIG. 2, the notebook PC 30 operates in any one of the states "AC", "BA", and "CH". For example, when the notebook PC 30 receives, from the control server 100, a control plan notifying that the notebook PC 30 operates in the state "BA" in a time zone "from 9:00 to 9:30", the notebook PC 30 operates in the state "BA" in the specified time zone.

Figure 3:
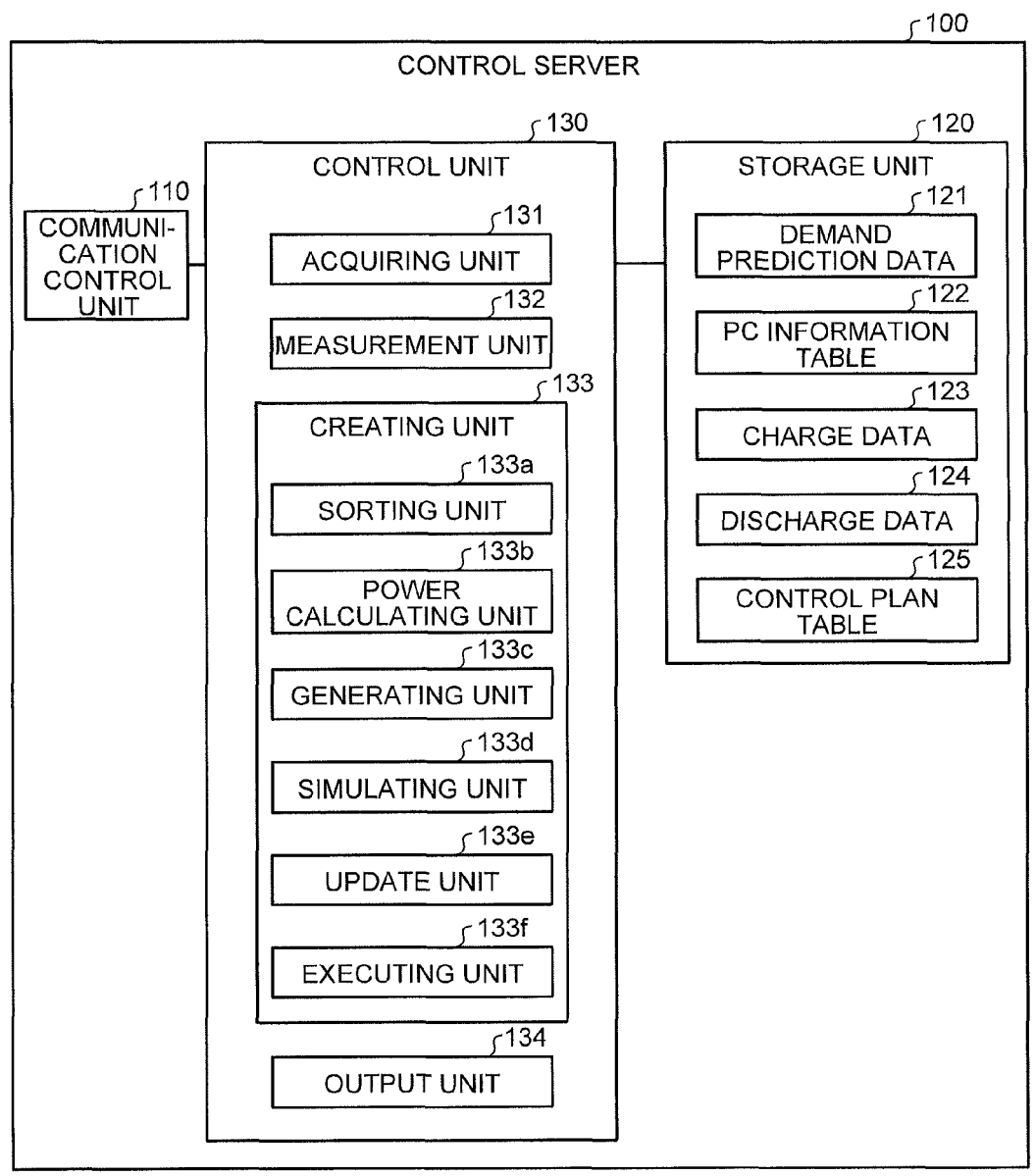
FIG. 3 is a diagram of the configuration of a control server according to the first embodiment.

Next, the configuration of the control server 100 illustrated in FIG. 1 will be described. FIG. 3 is a diagram of the configuration of the control server according to the first embodiment. As illustrated in FIG. 3, the control server 100 includes a communication control unit 110, a storage unit 120, and a control unit 130.

The communication control unit 110 is a processing unit that sends and receives data with the distribution board 20 and the notebook PC 30. The communication control unit 110 corresponds to a network interface card (NIC), for example. The control unit 130, described later, sends and receives data with the distribution board 20 and the notebook PC 30 through the communication control unit 110.

The storage unit 120 includes demand prediction data 121, a PC information table 122, charge data 123, discharge data 124, and a control plan table 125. The storage unit 120 corresponds to a storage device such as a semiconductor memory device including RAM (Random Access Memory), ROM (Read Only Memory), and flash memory, for example.

The demand prediction data 121 is the time series data of a predicted electric power demand in the system. For example, the demand prediction data 121 is data that associates the time zones with the electric power demand value in a day. The electric power demand value is calculated from the statistical data of power consumption values in the past, for example.

Figures 4, 5:
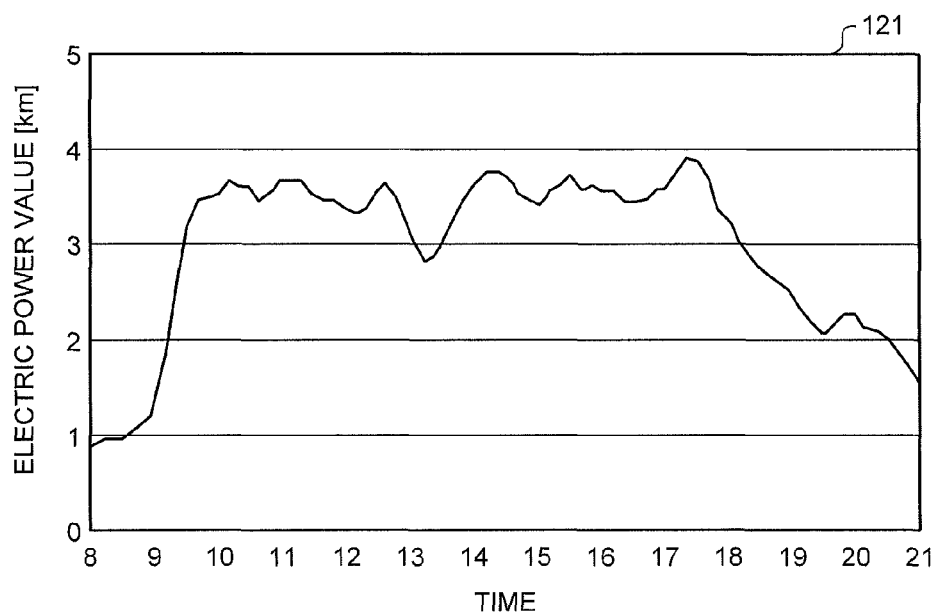
FIG. 4 is a diagram of exemplary demand prediction data.
FIG. 5 is a diagram of an exemplary PC information table.

FIG. 4 is a diagram of exemplary demand prediction data. In FIG. 4, the horizontal axis expresses time, and the vertical axis expresses an electric power value (kW). FIG. 4 illustrates the demand prediction data 121 for a day in a company by example. For example, the demand prediction data 121 is calculated from the statistical data of power consumption values in the past, which are values of electric power consumed by all products that consume electric power in the company. In FIG. 4, the case is shown where the pattern of the demand prediction data 121 is one pattern. However, the pattern is not limited thereto. For example, the demand prediction data 121 is different on a day of the week or times. In the case where a plurality of ways to change is predicted, a plurality of patterns exists in some cases.

The PC information table 122 holds various items of information related to the notebook PC 30, for example. FIG. 5 is a diagram of an exemplary PC information table. As illustrated in FIG. 5, the PC information table 122 stores items "ID", "observable or unobservable", "controllable or uncontrollable", "state", "battery capacity", and "charging rate" in association with each other.

In the items in FIG. 5, the ID expresses an ID (Identification) that uniquely identifies the notebook PC 30 in the company. The observable or unobservable expresses whether the control server 100 is enabled to observe the notebook PC 30 of interest. For example, "a circle" on the observable or unobservable expresses that the control server 100 is enabled to observe the notebook PC 30 of interest, that is, the notebook PC 30 of interest is connected to the in-house LAN 10. Moreover, for example, "a cross" on the observable or unobservable expresses that the control server 100 is not enabled to observe the notebook PC 30 of interest, that is, the notebook PC 30 of interest is not connected to the in-house LAN 10.

In FIG. 5, the controllable or uncontrollable expresses whether the notebook PC 30 of interest is connected to the power supply line 40. For example, "a circle" on the controllable or uncontrollable expresses that the notebook PC 30 of interest is connected to the power supply line 40. Moreover, for example, "a cross" on the controllable or uncontrollable expresses that the notebook PC 30 of interest is not connected to the power supply line 40.

The state expresses the present state of the notebook PC 30 of interest. For example, the state "AC" expresses the state in which the rechargeable battery is not charged or discharged and the notebook PC operates at AC power. Furthermore, for example, the state "BA" expresses the state in which the notebook PC operates by discharging the rechargeable battery. In addition, for example, the state "CH" expresses the state in which the notebook PC operates at AC power while the rechargeable battery is being charged. The battery capacity expresses the capacity [Wh] of electric power defined as the specifications of the battery of the notebook PC 30 of interest. The charging rate expresses the present charging rate (%) of the notebook PC 30 of interest. It is noted that the notebook PC 30 used in the company is registered in advance on the PC information table 122, for example. Moreover, "a dash" in FIG. 5 expresses that no corresponding data is found.

As illustrated in FIG. 5, for example, the PC information table 122 stores the ID "PC 1", "a circle" on the observable or unobservable, "a circle" on the controllable or uncontrollable, the state "AC", a battery capacity of "65", and a charging rate of "80" in association with each other. In other words, this expresses that PC 1 is connected to the network 10a and to the power supply line 40 and operates at AC power, the battery capacity is 65 [Wh], and the present charging rate is 80%. Moreover, the PC information table 122 also similarly stores information about the other notebook PCs 30.

Again referring to FIG. 3, the charge data 123 is data that expresses changes in the charging rate in charging the battery, for example. For example, the charge data 123 is data that associates the charging rate with time in charging the battery of the notebook PC 30. The charge data 123 is defined as the specifications of the battery. Moreover, such a configuration may be possible in which the charge data 123 stores the charging rate for individual time periods in charging the battery of the notebook PC 30 and the charging rate is calculated from stored data.

Figure 6:
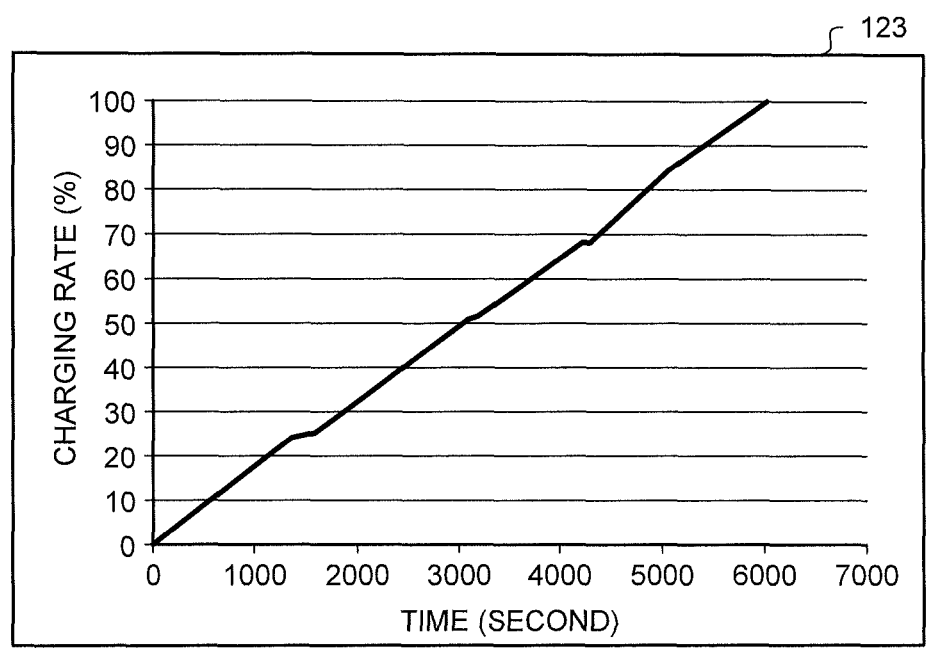
FIG. 6 is a diagram of exemplary charge data.

FIG. 6 is a diagram of exemplary charge data. In FIG. 6, the horizontal axis expresses time (second), and the vertical axis expresses the charging rate (%). FIG. 6 illustrates the charging rate in charging the battery of the notebook PC 30 by example. It is noted that here, the charge data 123 of the battery mounted on a certain notebook PC 30 is shown for convenience of explanation. However, the charge data 123 is stored in association with the individual notebook PCs 30. For example, the charge data 123 is stored in association with the individual IDs of the notebook PCs 30.

Again referring to FIG. 3, the discharge data 124 is data that expresses changes in the charging rate in discharging the battery, for example. For example, the discharge data 124 is data that associates the charging rate with time in discharging the battery of the notebook PC 30. The discharge data 124 is defined as the specifications of the battery. Such a configuration may be possible in which the discharge data 124 stores the charging rate for individual time periods in discharging the battery of the notebook PC 30 and the charging rate is calculated from stored data.

Figure 7:
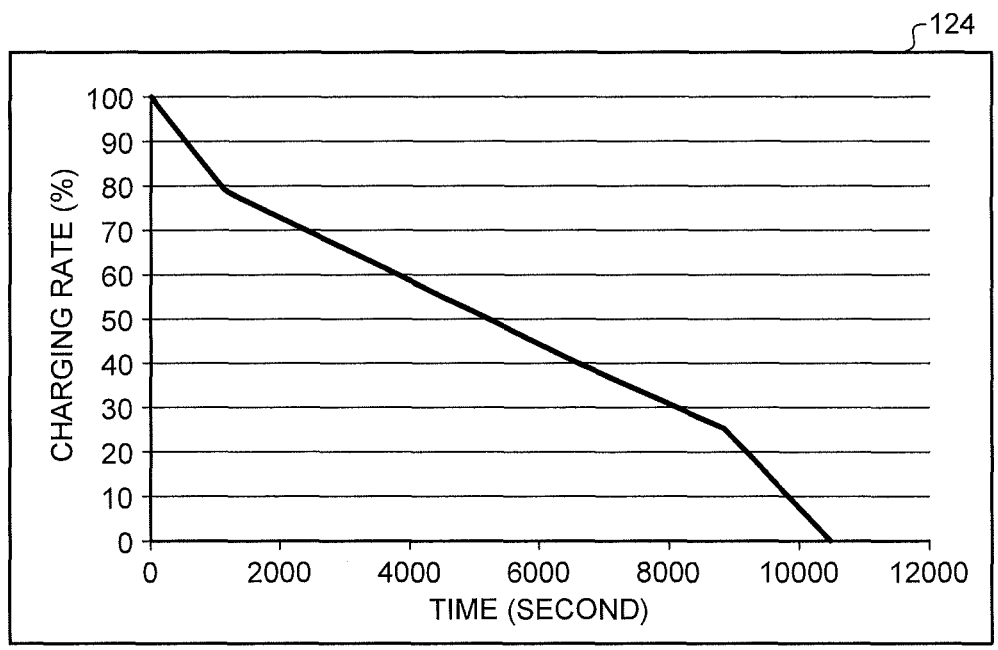
FIG. 7 is a diagram of exemplary discharge data.

FIG. 7 is a diagram of exemplary discharge data. In FIG. 7, the horizontal axis expresses time (second), and the vertical axis expresses the charging rate (%). FIG. 7 illustrates the charging rate in discharging the battery of the notebook PC 30 by example. It is noted that here, the discharge data 124 of the battery mounted on a certain notebook PC 30 is shown for convenience of explanation. However, the discharge data 124 is stored for the individual notebook PCs 30. For example, the discharge data 124 is stored in association with the individual IDs of the notebook PCs 30.

Again referring to FIG. 3, the control plan table 125 holds information about a control plan that specifies charging and discharging individual rechargeable batteries for time zones. FIG. 8 is a diagram of an exemplary control plan table. As illustrated in FIG. 8, the control plan table 125 stores IDs and half-hour time zones in association with each other. For example, the time zone "9:00" corresponds to a time zone from nine o'clock to a half past nine o'clock. Moreover, a single record on the control plan table 125 corresponds to the control policy of the notebook PC 30 of interest.

As illustrated in FIG. 8, the control plan table 125 stores the ID "PC 1" with a time zone from nine o'clock to a half past eleven o'clock and the state "AC", a time zone from a half past eleven o'clock to a half past twelve o'clock and the state "CH", and a time zone from a half past twelve o'clock to a half past thirteen o'clock and the state "BA" in association with each other, for example. In other words, the control plan table 125 stores the operations that PC 1 operates at AC power from nine o'clock to a half past eleven o'clock, operates from a half past eleven o'clock to a half past twelve o'clock while charging the rechargeable battery, and operates from a half past twelve o'clock to a half past thirteen o'clock while discharging the rechargeable battery. Moreover, the control plan table 125 similarly stores the states of the other notebook PCs 30 for the individual time zones. It is noted that here, the case is described where the control plan table 125 specifies the state of the notebook PC 30 for every half hour. However, the control plan table 125 is not limited thereto. For example, such a configuration may be possible in which the control plan table 125 specifies the state of the notebook PC 30 for every ten minutes.

The control unit 130 includes an acquiring unit 131, a measurement unit 132, a creating unit 133, and an output unit 134. For example, the control unit 130 corresponds to an integrated device such as an ASIC (Application Specific Integrated Circuit) and an FPGA (Field Programmable Gate Array). Moreover, for example, the control unit 130 corresponds to an electronic circuit such as a CPU and an MPU (Micro Processing Unit).

The acquiring unit 131 is a processing unit that acquires various of information of the notebook PC 30 and registers the acquired information on the PC information table 122. It is noted that for the timing of acquiring information by the acquiring unit 131, the user of the control server 100 may set a given timing. For example, such a configuration may be possible in which the acquiring unit 131 acquires information immediately before the creating unit 133, described later, generates a control plan.

The processes of the acquiring unit 131 will be described with reference to FIG. 5. For example, the acquiring unit 131 acquires information from PC 2 that the state of PC 2 is the state "CH", the charging rate is "50%", and PC 2 is connected to the power supply line 40. The acquiring unit 131 records the acquired information on the PC information table 122 in FIG. 5. For example, the acquiring unit 131 records "a circle" on the controllable or uncontrollable, the state "CH", and a charging rate of "50" on the PC information table 122 in association with PC 2. Moreover, the acquiring unit 131 determines that PC 2 is connected to the in-house LAN 10 because the acquiring unit 131 acquires information from PC 2, and records "a circle" on the observable or unobservable on the PC information table 122. Furthermore, for example, the acquiring unit 131 determines that a PC whose information is not acquired is not connected to the in-house LAN 10, and records "a cross" on the observable or unobservable on the PC information table 122. For example, in the case where the acquiring unit 131 is not enabled to acquire information about PC 3 at the timing of acquiring information about the other PCs, the acquiring unit 131 determines that PC 3 is not connected to the in-house LAN 10, and records "a cross" on the observable or unobservable on the PC information table 122.

The measurement unit 132 measures electric power consumed in the system in FIG. 1. For example, the measurement unit 132 measures the total amount of electric power consumed by electrical appliances connected to the power supply line 40 in the company. The measurement unit 132 records information about the measured amount of electric power on the storage unit 120. Information about electric power stored on the storage unit 120 is omitted in FIG. 5. A method for measuring electric power consumed in the company by the measurement unit 132 is applicable to all the previously existing techniques. For example, such a configuration may be possible in which the distribution board 20 measures the amount of electric power supplied through the power supply line 40 and the measurement unit 132 acquires the amount of electric power measured from the distribution board 20. Moreover, for example, such a configuration may be possible in which the measurement unit 132 measures the amount of electric power supplied from all receptacles in the company and calculates the sum total.

The creating unit 133 is a processing unit that sorts the notebook PCs 30 into a plurality of groups based on the remaining energy of the rechargeable batteries of the notebook PCs 30, performs local search on individual group, and generates a control plan. The creating unit 133 includes a sorting unit 133a, a power calculating unit 133b, a generating unit 133c, a simulating unit 133d, an update unit 133e, and an executing unit 133f.

The sorting unit 133a is a processing unit that sorts the notebook PCs 30 into a plurality of groups based on the remaining energy of the rechargeable batteries of the notebook PCs 30. The sorting unit 133a sorts a plurality of devices into a plurality of groups in such a way that the total value (or the distribution) of the remaining energy of the rechargeable batteries of the notebook PCs 30 included in a certain group is a value similar to the total value of the remaining energy of the rechargeable batteries of a plurality of the notebook PCs 30 included in a different group. As an example in the first embodiment, the same number of the notebook PCs is included in individual group. It is noted that the remaining energy of the rechargeable battery corresponds to a value that the battery capacity is multiplied by the charging rate, which are recorded on the PC information table 122.

Figure 9:
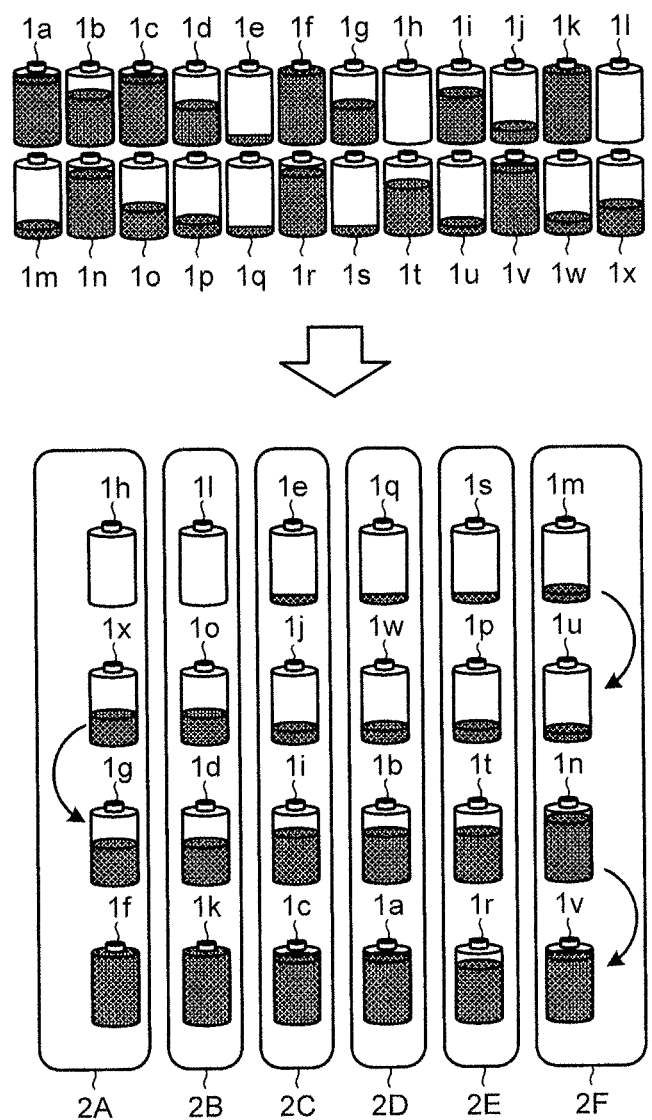
FIG. 9 is a diagram illustrative of processes performed by a sorting unit according to the first embodiment.

FIG. 9 is a diagram illustrative of processes performed by the sorting unit according to the first embodiment. In FIG. 9, only the rechargeable batteries incorporated in the notebook PCs are illustrated and the illustrations of the notebook PCs 30 are omitted for convenience of explanation. For example, suppose that rechargeable batteries $1a$ to $1x$ are rechargeable batteries incorporated in notebook PCs $30a$ to $30x$, respectively. Suppose that a rechargeable battery with a larger hatched portion is a rechargeable battery with a larger remaining energy. The sorting unit 133a rearranges the rechargeable batteries $1a$ to $1x$ in order of fewer remaining energy. It is noted that such a configuration may be possible in which rechargeable batteries with the same remaining energy are arranged in any order.

For example, when the sorting unit 133a rearranges the rechargeable batteries $1a$ to $1x$, the rechargeable batteries are arranged as the rechargeable batteries $1h$, $1l$, $1e$, $1q$, $1s$, $1m$, $1u$, $1p$, $1w$, $1j$, $1o$, $1x$, $1g$, $1d$, $1i$, $1b$, $1t$, $1n$, $1v$, $1r$, $1a$, $1c$, $1k$, and $1f$ in order of fewer remaining energy.

Subsequently, the sorting unit 133a sorts the rechargeable batteries $1h$, $1x$, $1g$, and $1f$ into group 2A. Namely, group 2A includes the notebook PCs $30h$, $30x$, $30g$, and $30f$. The sorting unit 133a sorts the rechargeable batteries $1l$, $1o$, $1d$, and $1k$ into group 2B. Namely, group 2B includes the notebook PCs $30l$, $30o$, $30d$, and $30k$. The sorting unit 133a sorts the rechargeable battery $1e$, $1j$, $1i$, and $1c$ into group 2C. Namely, group 2C includes the notebook PCs $30e$, $30j$, $30i$, and $30c$.

The sorting unit 133a sorts the rechargeable batteries $1q$, $1w$, $1b$, and $1a$ into group 2D. Namely, group 2D includes the notebook PCs $30q$, $30w$, $30b$, and $30a$. The sorting unit 133a sorts the rechargeable batteries $1s$, $1p$, $1t$, and $1r$ into group 2E. Namely, group 2E includes the notebook PCs $30s$, $30p$, $30t$, and $30r$. The sorting unit 133a sorts the rechargeable batteries $1m$, $1u$, $1n$, and $1v$ into group 2F. Namely, group 2F includes the notebook PCs $30m$, $30u$, $30n$, and $30v$.

Figures 10, 11:
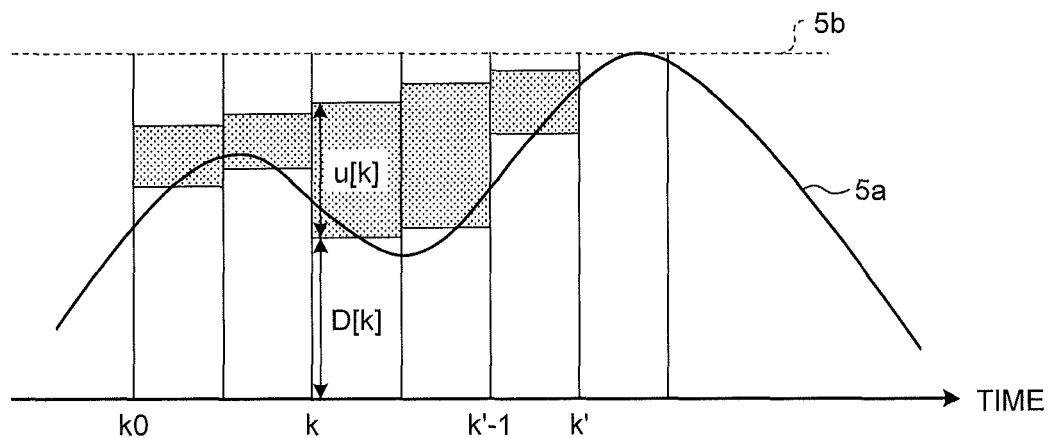
FIG. 10 is a diagram of an exemplary sorted result according to the first embodiment.
FIG. 11 is a diagram illustrative of processes performed by a power calculating unit according to the first embodiment.

As described above, the sorting unit 133a sorts the notebook PCs $30a$ to $30x$ into groups 2A to 2F, and the total values of the remaining energy of the rechargeable batteries of the notebook PCs 30 included in the individual group are similar values. The sorting unit 133a outputs information about the sorted result to the generating unit 133c, the simulating unit 133d, and the update unit 133e. FIG. 10 is a diagram of an exemplary sorted result according to the first embodiment. As illustrated in FIG. 10, the sorted result associates group identification information that uniquely identifies groups with an ID group. The ID group includes IDs that uniquely identify the notebook PCs 30 included in a group. For example, suppose that the IDs of the notebook PCs $30a$ to $30x$ are PC 1 to PC 24, respectively.

In FIG. 10, for example, "PC 8, PC 24, PC 7, and PC 6" are included in the ID group corresponding to group identification information "group 2A". Namely, group 2A includes the notebook PCs 30*h*, 30*x*, 30*g*, and 30*f*.

Again referring to FIG. 3, the power calculating unit 133*b* is a processing unit that calculates electric power allocated to the groups sorted at the sorting unit 133*a*. For example, the power calculating unit 133*b* calculates the values of electric power allocated to the individual group based on Expression (1). A predicted peak electric power value expressed in Expression (1) is the predicted peak electric power value of the entire system except the power consumption of the notebook PCs 30. The present power consumption is the present power consumption of the entire system except the power consumption of the notebook PCs 30. The power calculating unit 133*b* outputs information about electric power allocated to the individual group to the simulating unit 133*d*.

Electric power allocated to individual group=(a predicted peak electric power value−a present power consumption)/the number of groups (1)

Subsequently, the processes of the power calculating unit 133*b* will be described in more detail. More specifically, the power calculating unit 133*b* solves an optimization problem expressed in Expression (2), and calculates electric power usable by the notebook PCs 30 in the individual time zones, where the conditions of Expressions (3), (4), and (5) are satisfied. In Expressions (2) to (5), "k" is a variable expressing the individual time zones. FIG. 11 is a diagram illustrative of processes performed by the power calculating unit according to the first embodiment. In FIG. 11, the horizontal axis expresses time, and the vertical axis expresses the electric power value. Line 5*a* expresses the predicted value of the electric power demand value in the individual time zones except the electric power of the notebook PCs 30. Line 5*b* is the maximum value of the predicted value of the electric power demand value except the electric power of the notebook PCs 30, and corresponds to Dmax. u [k] is the total value of electric power allocated to all the notebook PCs 30 in time zone k. D [k] is the predicted value of the electric power demand value except the electric power of all the notebook PCs 30 in time zone k. It is noted that the time zone in which the predicted value of the electric power demand value takes the maximum value is k'.

$$\min \Sigma u[k] \quad (2)$$

$$u[k] \leq D\max - D[k] \quad (3)$$

$$D[k-1]+u[k-1] \quad (4)$$

$$\Sigma \leq \bar{x}[k'-1] \quad (5)$$

Here, Expression (2) is an optimization problem that the area of the hatched portions in FIG. 11 is minimized. Expression (3) is a conditional expression that electric power allocated to the notebook PCs 30 in a time zone previous to a certain time zone k does not exceed the maximum value of an electric power demand. Expression (4) is a condition that the total value of u [k] and D [k] is gradually increased. It is noted that Expression (5) expresses that the average remaining energy of the rechargeable batteries of the notebook PCs 30 in a time zone previous to time zone k' takes a predetermined value τ or more. Thus, the average remaining energy of the rechargeable batteries of the notebook PCs 30 can be at a predetermined value τ or more before the average remaining energy reaches the maximum value of the predicted value of the electric power demand value except the electric power of the notebook PCs 30.

The power calculating unit 133*b* solves the optimization problem of Expression (2), calculates u [k] in the individual time zone, and divides u [k] by the number of groups. Thus, the power calculating unit 133*b* calculates electric power allocated to the individual group in the individual time zone, and outputs information about the calculated electric power to the simulating unit 133*d*.

The generating unit 133*c* is a processing unit that generates a control plan in units of groups sorted at the sorting unit 133*a*. First, the states of the notebook PCs 30 on the control plan table 125 are set in the individual time zones, and an initial control plan is generated. FIG. 12 is a diagram illustrative of processes performed by the generating unit according to the first embodiment. For an example in FIG. 12, among the records included in the control plan table 125, only PCs 8, 24, 7, and 6 included in group 2A are illustrated. As illustrated in FIG. 12, for example, the generating unit 133*c* makes reference to the PC information table 122, and sets the state "AC" to all the time zones of controllable PCs. Moreover, the generating unit 133*c* makes reference to the PC information table 122, and sets a state "UN1" to all the time zones of unobservable PCs.

Furthermore, the generating unit 133*c* makes reference to the PC information table 122, and sets a state "UN2" to all the time zones of observable and uncontrollable PCs. It is noted that here, the case is described where the state "AC" is set to all the time zones of controllable PCs. However, setting states is not limited thereto. For example, such a configuration may be possible in which the state "BA" is set to all the time zones of controllable PCs. In addition, for example, such a configuration may be possible in which the states of the individual time zones of the notebook PCs 30 in a control plan already generated are set to the individual time zones of the corresponding notebook PCs 30.

Here, the states "UN1" and "UN2" will be described. The state "UN1" expresses the state assumed for unobservable PCs. For example, the state "UN1" is set as a visionary state in which the charging rate of the rechargeable battery is reduced in the discharging state and an unobservable PC uses electric power in the charging state. This takes account the fact that the rechargeable battery of an unobservable notebook PC 30 is discharged under no observation. Moreover, this takes account the fact that an unobservable notebook PC 30 is connected to the power supply line 40 in the company to increase an electric power demand. Furthermore, the state "UN2" expresses the state assumed for uncontrollable PCs. For example, the state "UN2" is set as a visionary state in which the charging rate of the rechargeable battery is reduced in the discharging state and an uncontrollable PC uses electric power in operation at AC power. This takes account the fact that an uncontrollable notebook PC 30 is connected to the power supply line 40 in the company to increase an electric power demand.

In addition, the generating unit 133*c* selects a given time zone of a controllable notebook PC 30 on the generated control plan, and switches the state to any one of the states "AC", "BA", and "CH". This is described as "a switching instruction". FIG. 13 is diagram (2) illustrative of processes performed by the generating unit according to the first embodiment. (1) in FIG. 13 is an exemplary control plan table 125 before switching the state, and (2) in FIG. 13 is an exemplary control plan table 125 after switching the state. As illustrated in FIG. 13, for example, the generating unit 133c selects the time zone "9:30" on PC 24. The generating unit 133c switches the states of the selected time zone and the time zones later to the state "BA". It is noted that a hatched area in FIG. 13 expresses the time zone of a PC to which a switching instruction is made. Moreover, the generating unit 133c records the time zone of a PC to which a switching instruction is made on the control plan table 125.

Furthermore, in the case where the state is switched, the generating unit 133c switches the states in the time zone and later until the generating unit 133c receives a switching instruction in the next time zone. FIG. 14 is a diagram (3) illustrative of processes performed by the generating unit according to the first embodiment. (1) in FIG. 14 is an exemplary control plan table 125 before switching the state, and (2) of FIG. 14 is an exemplary control plan table 125 after switching the state. FIG. 14 is the case where already switched states are included. In (1) in FIG. 14, the case will be described where an instruction is made to switch the state "BA" in the time zone "12:30" on PC 8. As illustrated in FIG. 14, for example, the generating unit 133c selects the time zone "11:30" on PC 8, and makes an instruction to switch the state to the state "CH". The generating unit 133c switches the state of the selected time zone and the time zone later to the state "CH". In this case, since the switching instruction is made on the state "BA" in the time zone "12:30" on PC 8, the creating unit 133 switches the state to the state "CH" until the time zone "12:00".

The generating unit 133c performs the processes for individual group, and outputs information about control plans for individual group to the simulating unit 133d.

Again referring to FIG. 3, the simulating unit 133d is a processing unit that simulates an electric power demand for individual time zone using control plans for individual group generated at the generating unit 133c. For example, the simulating unit 133d simulates an electric power demand in which the simulating unit 133d subtracts the power used amount of the notebook PC 30 from the demand prediction data 121 and adds the power used amount in the case where the notebook PCs 30 operate based on the control plan. It is noted that the simulating unit 133d simulates an electric power demand for individual group. The simulating unit 133d outputs the simulated result for individual group to the update unit 133e.

Figure 15:
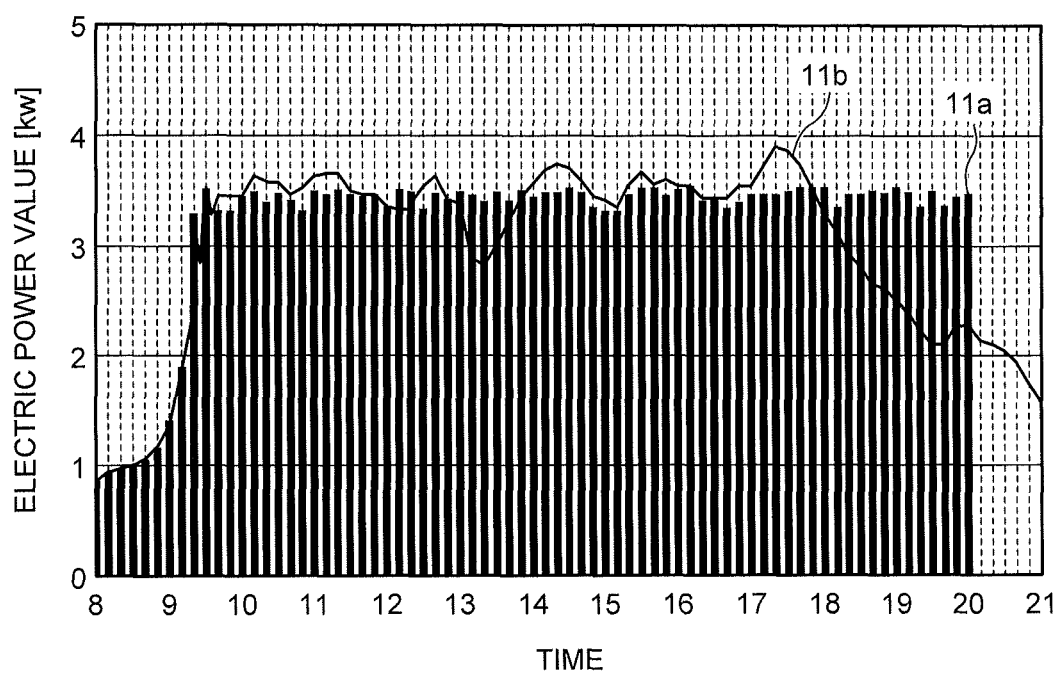
FIG. 15 is a diagram illustrative of processes performed by a simulating unit according to the first embodiment.

FIG. 15 is a diagram illustrative of processes performed by the simulating unit according to the first embodiment. In FIG. 15, the horizontal axis expresses time, and the vertical axis expresses an electric power value (kW). FIG. 15 is the simulated result in the case where a control plan is generated from eight o'clock to twenty o'clock at ten-minute intervals. As illustrated in FIG. 15, for example, the simulating unit 133d simulates an electric power demand at every ten minutes based on the control plan, and calculates a controlled peak 11a at every ten minutes. For example, the simulating unit 133d calculates a controlled peak maxj in the individual time zones using Expression (6) below. It is noted that 11b corresponds to the demand prediction data 121 in FIG. 4.

$$\max j (\text{demand prediction}[j] - \Sigma iEAi + \Sigma iEsi[j]) \qquad (6)$$

In Expression (6), i expresses the index of the notebook PC 30. j expresses the index of the time zone. For example, j=1 corresponds to a time zone from nine o'clock to a half past nine o'clock. A demand prediction [j] expresses a demand predicted value in the jth time zone, which is given from the demand prediction data 121, for example. Esi[j] expresses an electric power value in the state in the jth time zone of the ith notebook PC 30. For example, the power used amount EA in the state "AC" is 10 W, for example. Moreover, the electric power value EB in the state "BA" is 0 W, for example. Furthermore, the electric power value EC in the state "CH" is 60 W, for example. In addition, the power used amount EU1 in the state "UN1" is EC W because electric power in the state "CH" is used. Moreover, the power used amount EU2 in the state "UN2" is EA W because electric power in the state "AC" is used. Furthermore, EAi expresses the power used amount in the state "AC" of the ith notebook PC 30. It is noted that Expression (6) is an example, and the Expression (6) is not limited thereto. For example, in the case where electric power is controlled with more margins, $\Sigma iEAi$ is not subtracted.

In addition, the simulating unit 133d simulates an electric power demand in the individual time zones by adding constraints to the control plan. For example, the simulating unit 133d calculates the charging rate of the rechargeable battery in the individual time zones for the individual notebook PCs 30. For example, the simulating unit 133d makes reference to the PC information table 122, and acquires the charging rate of the notebook PC 30. In the case where the rechargeable battery of the notebook PC 30 is charged for some time period, the simulating unit 133d makes reference to the charge data 123 in FIG. 6, and estimates a charging rate after the time period elapses. In the case where the rechargeable battery of the notebook PC 30 is discharged for some time period, the simulating unit 133d makes reference to the discharge data 124 in FIG. 7, and estimates a charging rate after the time period elapses.

The simulating unit 133d then determines whether the estimated charging rate satisfies the condition in Expression (7) and satisfies Expression (8). The constraint in Expression (7) is that the charge amount is at the maximum at final time instant k". Ci in Expression (7) expresses the electric capacitance of the ith notebook PC 30. N in Expression (8) is the number of groups sorted at the sorting unit 133a. It is noted that the constraints and the numeric values described here are examples, and the constraints and the numeric values are not limited thereto. The constraints and the numeric values may be freely set in consideration of the characteristics of the rechargeable battery, for example, by the user of the control server 100, for example.

$$\max \Sigma C_i[k''] \qquad (7)$$

power consumption in a group in the time zone $k \le$ $$u[k]/N \qquad (8)$$

In the case where the simulating unit 133d determines that Expressions (7) and (8) are not satisfied, the simulating unit 133d continues the state in the time zone immediately before for the state of the notebook PC 30. The simulating unit 133d again simulates an electric power demand using the changed control plan until the constraints are satisfied.

The update unit 133e is a processing unit that updates the control plan of the control plan table 125 to the control plan after switching the state in the case where the simulated result is improved more than the simulated result of the control plan before switching the state. The update unit 133e evaluates the simulated result for individual group, and determines whether the control plan is updated for individual group.

For example, the update unit 133e finds the peak electric power from the simulated result. The update unit 133e acquires the power used amount in the individual time zone by the present time instant in a day as an actual measurement value. The update unit 133e acquires the power used amount in the individual time zone after the present time instant in a day from the simulated result. The update unit 133e calculates the maximum value in the acquired power used amount as the peak electric power. The update unit 133e compares the calculated peak electric power with the peak electric power calculated from the simulated result of the control plan before switching the state. The update unit 133e updates the control plan to the control plan after switching the state in the case where the peak electric power is lower than the peak electric power calculated from the simulated result of the control plan before switching the state. The update unit 133e updates the control plan for individual group.

It is noted that here, the case is described where the update unit 133e uses the peak electric power as the evaluated value. However, the present invention is not limited thereto. For example, such a configuration may be possible in which the update unit 133e uses one of or combines a plurality of items for the evaluated value such as the power used amount after the present time instant, the charge amount of the rechargeable battery (the sum of the products of the charging rate and the battery capacity), the number of times of switching the states, and the minimum power used amount. In the case of combining a plurality of items, evaluation functions are weighted and added, for example, to make a single evaluation function, and the items can be processed as a single evaluation function.

The executing unit 133f determines whether a predetermined termination condition is satisfied. For example, the executing unit 133f determines whether five minutes elapse after the creating unit 133 starts processing. In the case where five minutes do not elapse, the executing unit 133f repeatedly performs the processes of the generating unit 133c, the simulating unit 133d, and the update unit 133e. It is noted that here, the case is described where the termination condition is that five minutes elapse. However, the condition is not limited thereto. For example, such a configuration may be possible in which the termination condition is a given time period, or a given number of repetitions.

On the other hand, in the case where five minutes elapse, the executing unit 133f outputs the updated control plan table 125 to the output unit 134. For example, the executing unit 133f outputs the control plan table 125 modified so as to satisfy the constraint at the simulating unit 133d to the output unit 134.

The output unit 134 outputs the control plan. For example, the output unit 134 receives the control plan table 125 from the executing unit 133f. The output unit 134 outputs the records on the received control plan table 125 to the corresponding notebook PC 30.

Figure 16:
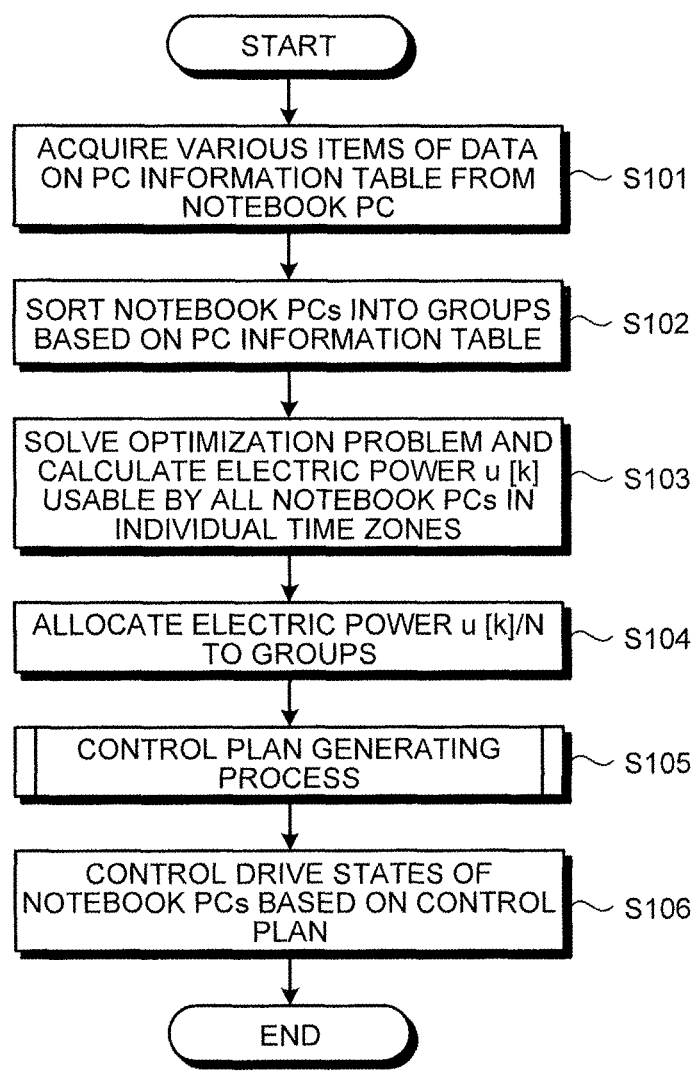
FIG. 16 is a flowchart of process procedures performed by the control server according to the first embodiment.

Next, the process procedures of the control server 100 according to the first embodiment will be described. FIG. 16 is a flowchart of process procedures performed by the control server according to the first embodiment. For example, the processes illustrated in FIG. 16 are performed at predetermined time intervals.

As illustrated in FIG. 16, the control server 100 acquires various items of data on the PC information table 122 from the notebook PC 30 (Step S101). The control server 100 sorts a plurality of the notebook PCs 30 into a plurality of groups based on the PC information table 122 (Step S102). In Step S102, the control server 100 sorts the notebook PCs 30 in such a way that the total value of the remaining energy of the rechargeable batteries of a plurality of the notebook PCs included in a group is a value similar to the total value of the remaining energy of the rechargeable batteries of a plurality of the notebook PCs included in a different group.

The control server 100 solves an optimization problem, and calculates electric power u [k] usable by all the notebook PCs 30 in the individual time zone (Step S103). The control server 100 allocates electric power u [k]/N to the individual group (Step S104).

The control server 100 performs the control plan generating process (Step S105), and controls the drive states of the notebook PCs based on the control plan (Step S106).

Figure 17:
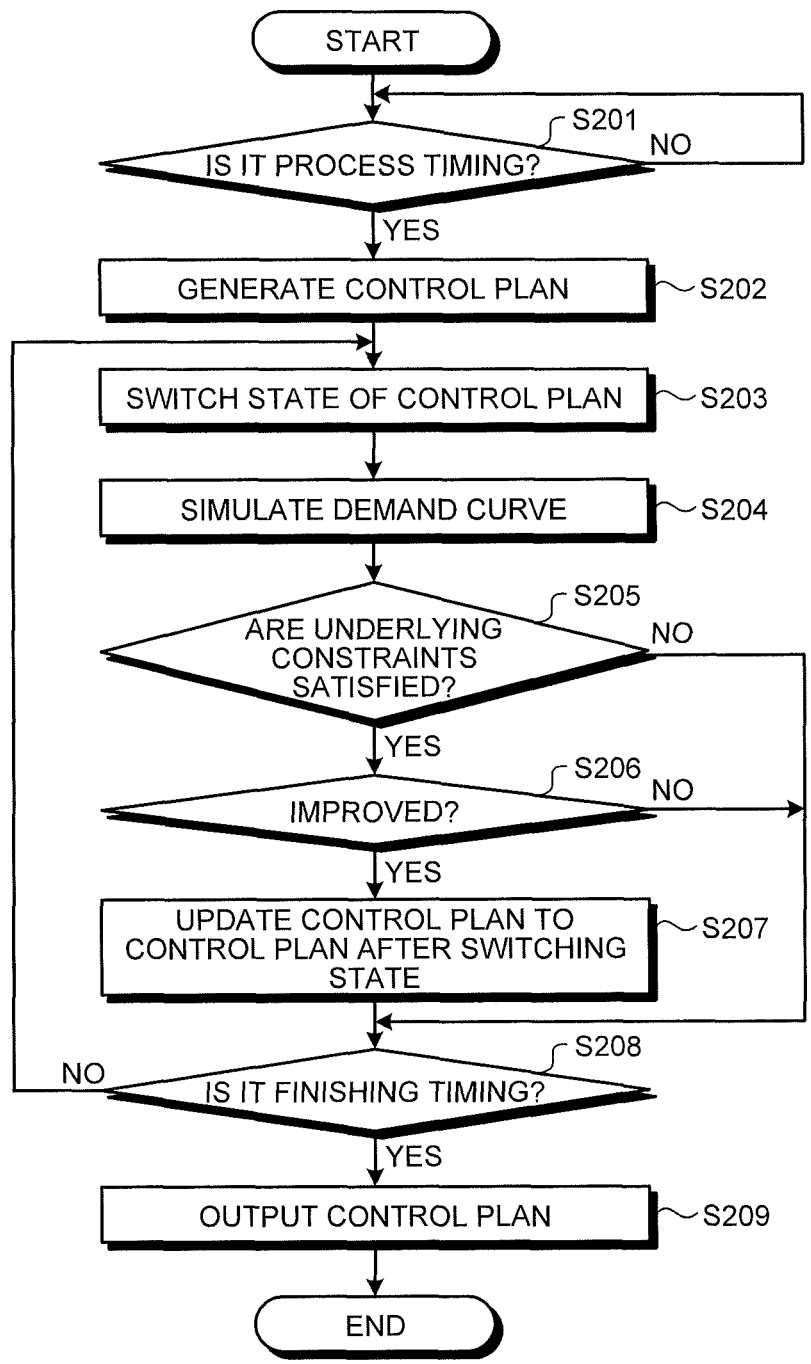
FIG. 17 is a flowchart of the process procedures of a control plan generating process according to the first embodiment.

Next, the process procedures of the control plan generating process illustrated in Step S105 in FIG. 16 will be described. FIG. 17 is a flowchart of the process procedures of the control plan generating process according to the first embodiment. As illustrated in FIG. 17, the control server 100 determines whether it is the process timing (Step S201). In the case where it is not the process timing (No in Step S201), the control server 100 again goes to Step S201.

On the other hand, in the case where it is the process timing (Yes in Step S201), the control server 100 generates a control plan (Step S202). The control server 100 switches the state of the control plan (Step S203), and simulates a demand curve (Step S204).

The control server 100 determines whether the underlying constraints are satisfied (Step S205). The constraints in Step S205 correspond to the conditions shown in Expression (7) and Expression (8), for example. In the case where the underlying constraints are not satisfied (No in Step S205), the control server 100 goes to Step S208. On the other hand, in the case where the underlying constraints are satisfied (Yes in Step S205), the control server 100 goes to Step S206.

The control server 100 determines whether the demand curve is improved (Step S206). In the case where the demand curve is not improved (No in Step S206), the control server 100 goes to Step S208.

On the other hand, in the case where the demand curve is improved (Yes in Step S206), the control server 100 updates the control plan to the control plan after switching the state (Step S207). The control server 100 determines whether it is the finishing timing (Step S208). In the case where it is not the finishing timing (No in Step S208), the control server 100 goes to Step S203.

On the other hand, in the case where it is the finishing timing (Yes in Step S208), the control server 100 outputs the control plan (Step S209).

Next, the effect of the control server 100 according to the first embodiment will be described. The control server 100 sorts the notebook PCs 30 into a plurality of groups based on the remaining energy of the rechargeable batteries of the notebook PCs 30, and generates a control plan for the individual sorted groups. Thus, processes for local search in the case where a control plan is generated can be performed as divided for individual group, and a plan nearly the optimum plan can be generated in a fewer processes. Therefore, a control plan for reducing peak electric power can be generated for a short time even for the number of notebook PCs for which it is difficult to respond to calculation under centralized control.

Moreover, the control server 100 generates a control plan so as to satisfy the constraints shown in Expressions (7) and (8), so that the remaining energy of the rechargeable batteries of the notebook PCs 30 can be at the maximum at the final time instant without exceeding electric power values allocated to individual group.

[b] Second Embodiment

Figure 18:
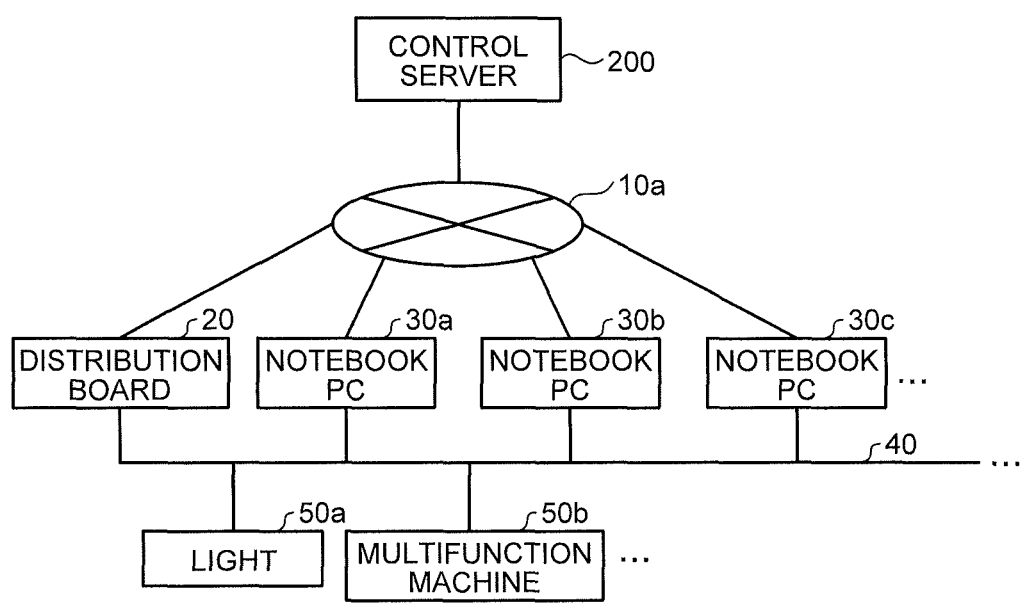
FIG. 18 is a diagram of the configuration of a system according to a second embodiment.

Next, the configuration of a system according to a second embodiment will be described. FIG. 18 is a diagram of the configuration of a system according to the second embodiment. As illustrated in FIG. 18, this system includes a distribution board 20, notebook PCs 30a, 30b, and 30c, a light 50a, a multifunction machine 50b, and a control server 200. The distribution board 20, the notebook PCs 30a, 30b, and 30c, and the control server 200 are connected to each other via a network 10a. Moreover, the distribution board 20, the notebook PCs 30a, 30b, and 30c, the light 50a, and the multifunction machine 50b are connected to a power supply line 40.

In FIG. 18, the distribution board 20, the notebook PCs 30a, 30b, and 30c, the light 50a, the multifunction machine 50b, and the control server 200 are included. The description on the distribution board 20 and the notebook PCs 30a, 30b, and 30c is similar to the description in the first embodiment, and the description is omitted here as the same reference numerals and signs are designated.

The control server 200 is a server apparatus installed in the company, and generates a control plan that specifies charging and discharging the batteries of a plurality of notebook PCs. The control server 200 according to the second embodiment groups the notebook PCs with similar remaining energy of the rechargeable batteries based on the remaining energy of the rechargeable batteries of the notebook PCs 30, and generates a control plan as the control server 200 considers the grouped notebook PCs as a single notebook PC.

Figure 19:
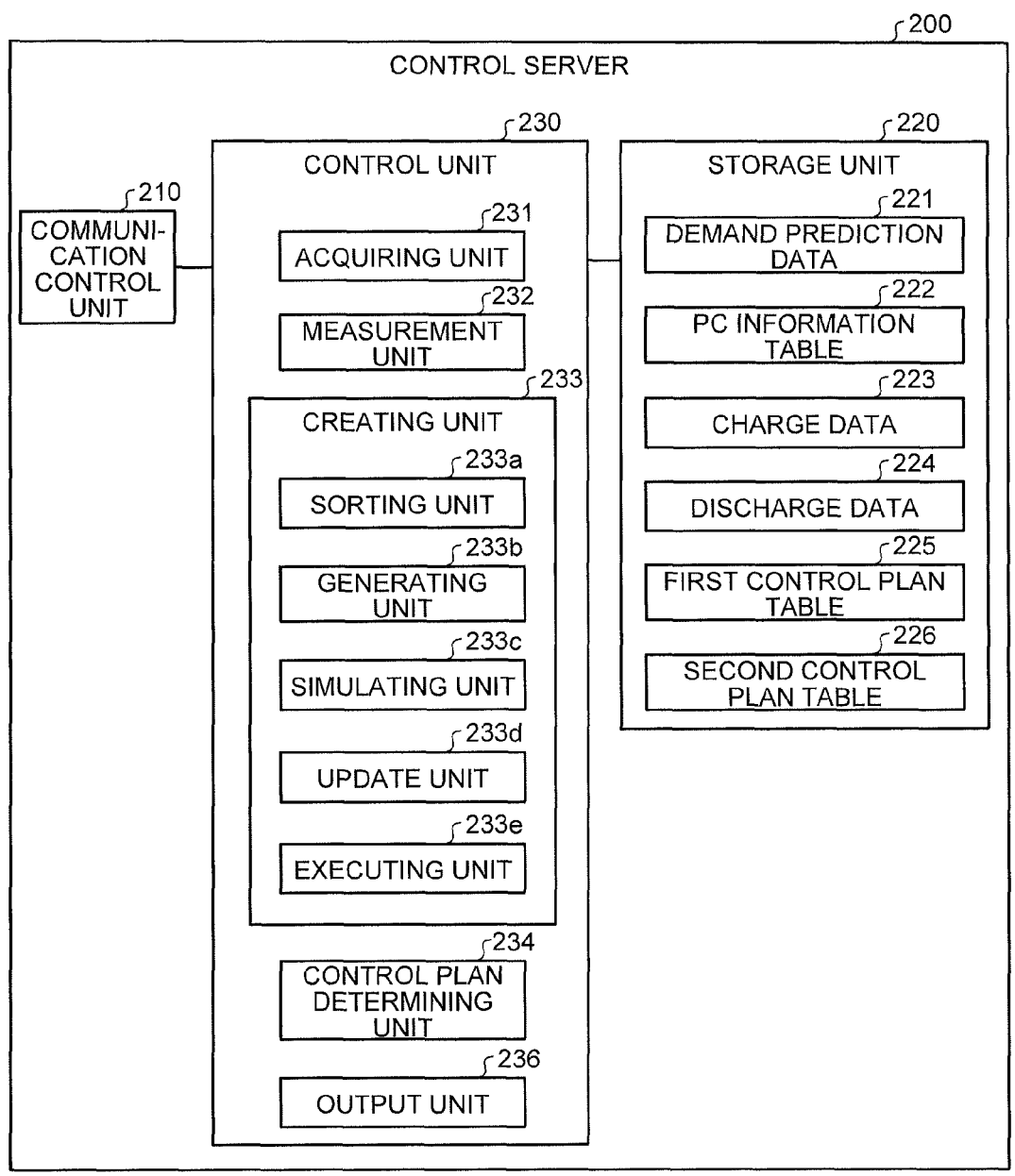
FIG. 19 is a diagram of the configuration of a control server according to the second embodiment.

FIG. 19 is a diagram of the configuration of the control server according to the second embodiment. As illustrated in FIG. 19, the control server 200 includes a communication control unit 210, a storage unit 220, and a control unit 230.

The communication control unit 210 is a processing unit that sends and receives data with the distribution board 20 and the notebook PC 30. The communication control unit 210 corresponds to a network interface card, for example. The control unit 230, described later, sends and receives data with the distribution board 20 and the notebook PC 30 through the communication control unit 210.

The storage unit 220 includes demand prediction data 221, a PC information table 222, charge data 223, discharge data 224, a first control plan table 225, and a second control plan table 226. The storage unit 220 corresponds to a storage device such as a semiconductor memory device including RAM, ROM, and flash memory, for example.

The demand prediction data 221 is the time series data of a predicted electric power demand in the system. For example, the demand prediction data 221 is data that associates the time zones with the electric power demand values in a day. The demand prediction data 221 corresponds to the demand prediction data 121 shown in the first embodiment.

The PC information table 222 holds various items of information related to the notebook PC 30, for example. The PC information table 222 corresponds to the PC information table 122 shown in the first embodiment.

The charge data 223 is data that expresses changes in the charging rate in charging the battery. The charge data 223 corresponds to the charge data 123 shown in the first embodiment.

The discharge data 224 is data that expresses changes in the charging rate in discharging the battery. The discharge data 224 corresponds to the discharge data 124 shown in the first embodiment.

The first control plan table 225 holds information about a control plan that specifies charging and discharging individual rechargeable batteries for time zones in the case where a plurality of the notebook PCs 30 included in the same group is considered as a single notebook PC. FIG. 20 is a diagram of an exemplary first control plan table. As illustrated in FIG. 20, this second control plan table 226 stores group IDs and half-hour time zones in association with each other. For example, the time zone "9:00" corresponds to a time zone from nine o'clock to a half past nine o'clock. The group ID is information that uniquely identifies groups.

The second control plan table 226 holds information about a control plan that specifies charging and discharging individual rechargeable batteries for time zones on the notebook PCs 30. The second control plan table 226 corresponds to the control plan table 125 shown in the first embodiment.

The control unit 230 includes an acquiring unit 231, a measurement unit 232, a creating unit 233, a control plan determining unit 234, and an output unit 236. The control unit 230 corresponds to an integrated device such as an ASIC and an FPGA, for example. Moreover the control unit 230 corresponds to an electronic circuit such as a CPU and an MPU, for example.

The acquiring unit 231 is a processing unit that acquires various items of information of the notebook PC 30 and registers the acquired information on the PC information table 222. It is noted that for the timing of acquiring information by the acquiring unit 131, the user of the control server 200 may set a given timing. For example, such a configuration may be possible in which the acquiring unit 231 acquires information immediately before the creating unit 233, described later, generates a control plan. The other descriptions of the acquiring unit 231 correspond to the description of the acquiring unit 131 according to the first embodiment.

The measurement unit 232 measures electric power consumed in the system in FIG. 18. For example, the measurement unit 232 measures the total amount of electric power consumed by electrical appliances connected to the power supply line 40 in the company. The measurement unit 232 records information about the measured amount of electric power on the storage unit 220. The information about electric power stored on the storage unit 220 is omitted in FIG. 20.

The creating unit 233 is a processing unit that sorts the notebook PCs 30 into a plurality of groups based on the remaining energy of the rechargeable batteries of the notebook PCs 30, considers the individual group as a single notebook PC to perform local search, and generates a first control plan. The creating unit 233 includes a sorting unit 233a, a generating unit 233b, a simulating unit 233c, an update unit 233d, and an executing unit 233e.

The sorting unit 233a is a processing unit that sorts the notebook PCs 30 into a plurality of groups based on the remaining energy of the rechargeable batteries of the notebook PCs 30. The sorting unit 233a groups the notebook PCs with similar remaining energy of the rechargeable batteries, and sorts a plurality of the notebook PCs 30 into a plurality of groups.

Figure 21:
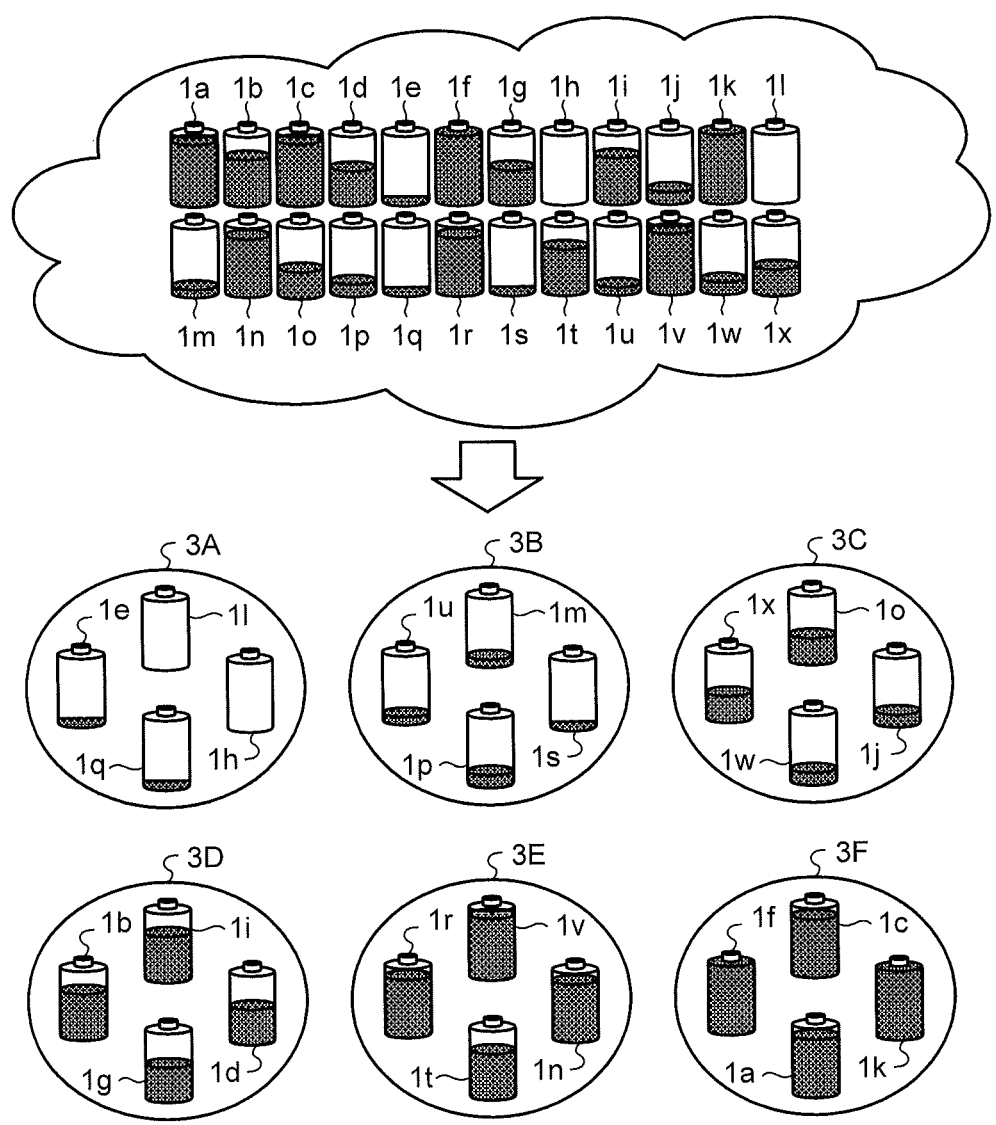
FIG. 21 is a diagram illustrative of processes performed by a sorting unit according to the second embodiment.

FIG. 21 is a diagram illustrative of processes performed by the sorting unit according to the second embodiment. In FIG. 21, only the rechargeable batteries incorporated in the notebook PCs are illustrated and the illustrations of the notebook PCs 30 are omitted for convenience of explanation. For example, suppose that rechargeable batteries 1a to 1x are rechargeable batteries incorporated in notebook PCs 30a to 30x, respectively. Suppose that a rechargeable battery with a larger hatched portion is a rechargeable battery with a larger remaining energy. The sorting unit 133a rearranges the rechargeable batteries 1a to 1x in order of fewer remaining energy. It is noted that such a configuration may be possible in which rechargeable batteries with the same remaining energy are arranged in any order.

For example, when the sorting unit 233a rearranges the rechargeable batteries 1a to 1x, the rechargeable batteries are arranged as the rechargeable batteries 1h, 1l, 1e, 1q, 1s, 1m, 1u, 1p, 1w, 1j, 1o, 1x, 1g, 1d, 1i, 1b, 1t, 1n, 1v, 1r, 1a, 1c, 1k, and 1f in order of fewer remaining energy. The sorting unit 233a sorts the first to fourth rechargeable batteries 1h, 1q, 1l, and 1e into group 3A. Namely, group 3A includes the notebook PCs 30h, 30q, 30l, and 30e.

The sorting unit 233a sorts the fifth to eighth rechargeable batteries 1s, 1m, 1u, and 1p into group 3B. Namely, group 3B includes the notebook PC 30s, 30m, 30u, and 30p.

The sorting unit 233a sorts the ninth to twelfth rechargeable batteries 1w, 1j, 1o, and 1x into group 3C. Namely, group 3C includes the notebook PC 30w, 30j, 30o, and 30x.

The sorting unit 233a sorts the thirteenth to sixteenth rechargeable batteries 1g, 1d, 1i, and 1b into group 3D. Namely, group 3D includes the notebook PC 30g, 30d, 30i, and 30b.

The sorting unit 233a sorts the seventeenth to twentieth rechargeable batteries 1t, 1n, 1v, and 1r into group 3E. Namely, group 3E includes the notebook PC 30t, 30n, 30v, and 30r.

The sorting unit 233a sorts the twenty-first to twenty-fourth rechargeable batteries 1a, 1c, 1k, and 1f into group 3F. Namely, group 3F includes the notebook PCs 30a, 30c, 30k, and 30f.

As described above, the sorting unit 233a sorts the notebook PCs 30a to 30x into groups 3A to 3F, so that the sorting unit 233a can group the notebook PCs with similar remaining energy of the rechargeable batteries. The sorting unit 133a outputs information about the sorted result to the generating unit 233b and the control plan determining unit 234. FIG. 22 is a diagram of an exemplary sorted result according to the second embodiment. As illustrated in FIG. 22, the sorted result associates group identification information that uniquely identifies groups with the ID group. The ID group includes IDs that uniquely identify the notebook PCs 30 included in a group. For example, suppose that the IDs of the notebook PCs 30a to 30x are PC 1 to PC 24, respectively.

In FIG. 22, for example, the ID group corresponding to group identification information "group 3A" is "PC 17, PC 8, PC 12, and PC 5". Namely, group 3A includes the notebook PCs 30h, 30q, 30l, and 30e.

Again referring to FIG. 19, the generating unit 233b is a processing unit that considers a plurality of the notebook PCs included in a group as a single notebook PC and generates a control plan. For example, in the case where the notebook PCs 30 are sorted as in FIG. 22, PC 17, PC 8, PC 12, and PC 5 are considered as a single notebook PC, "group 3A". Similarly, PC 16, PC 19, PC 13, and PC 21 are considered as a single notebook PC, "group 3B". PC 23, PC 10, PC 15, and PC 24 are considered as a single notebook PC, "group 3C". PC 2, PC 9, PC 4, and PC 7 are considered as a single notebook PC, "group 3D". PC 20, PC 14, PC 22, and PC 18 are considered as a single notebook PC, "group 3E". PC 1, PC 3, PC 11, and PC 6 are considered as a single notebook PC, "group 3F".

Moreover, the generating unit 233b considers that the rechargeable batteries in the individual group considered as a single notebook PC are the rechargeable batteries that are combined and included in groups. For example, it is considered that the rechargeable batteries of PC 17, PC 8, PC 12, and PC 5 are combined into the rechargeable batteries in group 3A.

The states are set in the individual time zone for the individual group on the control plan table 125, and the initial control plan is generated. FIG. 23 is diagram (1) illustrative of processes performed by the generating unit according to the second embodiment. For an example in FIG. 23, the description will be made with reference to groups 3A and 3B considered as single notebook PCs. As illustrated in FIG. 23, for example, the generating unit 233b makes reference to the PC information table 222, and sets the state "AC" to the time zones of all groups including controllable PCs. It is noted that although the description is omitted here, such a configuration may be possible in which in the case where a group includes an uncontrollable PC, the state "UN1" or "UN2" is set to the states of the individual time zone corresponding to the group.

Figure 24:
FIG. 24 is a diagram (2) illustrative of processes performed by the generating unit according to the second embodiment.

The generating unit 233b selects a given time zone in the generated control plan, and switches the state to any one of the states "AC", "BA", and "CH". This is described as "a switching instruction". FIG. 24 is diagram (2) illustrative of processes performed by the generating unit according to the second embodiment. (1) in FIG. 24 is an exemplary first control plan table 225 before switching the state, and (2) in FIG. 24 is an exemplary first control plan table 225 after switching the state. As illustrated in FIG. 24, for example, the generating unit 233b selects the time zone "9:30" on group 3B. The generating unit 233b switches the states of the selected time zone and the time zones later to the state "BA". It is noted that a hatched area in FIG. 24 expresses the time zone of a group to which a switching instruction is made. Moreover, the generating unit 233b records the time zone of a group to which a switching instruction is made on the first control plan table 225.

Figure 25:
FIG. 25 is a diagram (3) illustrative of processes performed by the generating unit according to the second embodiment.

Furthermore, in the case where the state is switched, the generating unit 233b switches the states in the time zone and later until the generating unit 233b receives a switching instruction in the next time zone. FIG. 25 is diagram (3) illustrative of processes performed by the generating unit according to the second embodiment. (1) in FIG. 25 is an exemplary first control plan table 225 before switching the state, and (2) in FIG. 25 is an exemplary first control plan table 225 after switching the state. FIG. 25 is the case where already switched states are included. In (1) in FIG. 25, the case will be described where an instruction is made to switch the state "BA" in the time zone "12:30" on group 3A. As illustrated in FIG. 25, for example, the generating unit 233b selects the time zone "11:30" on group 3B, and makes an instruction to switch the state to the state "CH". The generating unit 233b switches the state of the selected time zone and the time zone later to the state "CH". In this case, since the switching instruction is made on the state "BA" in the time zone "12:30" on group 3A, the generating unit 233b switches the state to the state "CH" until the time zone "12:00".

The generating unit 233b considers a plurality of the notebook PCs included in a group as a single notebook PC, performs the processes, and outputs information about the control plans for the individual group to the simulating unit 233c.

Again referring to FIG. 19, the simulating unit 233c is a processing unit that simulates an electric power demand for individual time zone using control plans for individual group generated at the generating unit 233b. For example, the simulating unit 233c subtracts the power used amount used by a group from the demand prediction data 221, adds the power used amount in the case where the group operates as the control plan, and simulates an electric power demand. The simulating unit 233c outputs the simulated result to the update unit 233d.

The simulating unit 233c simulates an electric power demand at every ten minutes based on control plans, and calculates a controlled peak 11a at every ten minutes. For example, the simulating unit 233c calculates the controlled peak maxj in the individual time zones using Expression (6) described in the first embodiment.

Here, in the case where the simulating unit 233c calculates the controlled peak maxj using Expression (6), the simulating unit 233c multiplies the power used amounts in the individual states by the number of the notebook PCs included in a group. In the second embodiment, the number of the notebook PCs of the individual group is four. In this case, the power used amount EA in the state "AC" is 10×4 W, for example. Moreover, the electric power value EB in the state "BA" is 0×4 W, for example. Furthermore, the electric power value EC in the state "CH" is 60×4 W, for example.

In addition, the simulating unit 233c simulates an electric power demand in the individual time zones by adding a constraint to the control plan. For example, the simulating unit 233c calculates the charging rate of the rechargeable battery in the individual time zones of a group. The charging rate of the charging batteries in the individual time zones of a group is the charging rate in the case where the charging batteries of the notebook PCs included in a group are considered as a single battery. Moreover, the simulating unit 233c sets the remaining amount of the rechargeable battery of a group to the mean value of the remaining amount of the notebook PCs included in a group.

The simulating unit 233c makes reference to the charging rate of the rechargeable battery of a group and the charge data 223, and estimates a charging rate after the time period elapses. In the case where the rechargeable battery of a group is discharged for some time period, the simulating unit 233c makes reference to the discharge data 224, and estimates a charging rate after the time period elapses.

The simulating unit 233c determines whether the estimated charging rate fits to the constraints. For example, the simulating unit 233c determines whether the estimated charging rate fits to the constraints that the sum total of the battery remaining energy is at the maximum in the end of the calculated interval in the control plans generated so far. In the case where the simulating unit 233c determines that the constraints are not satisfied, the simulating unit 233c continues the state in the time zone immediately before for the state of the group. The simulating unit 233c again simulates an electric power demand using the changed control plan until the constraints are satisfied. It is noted that the constraints and the numeric values described here are examples, and are not limited thereto. The constraints and the numeric values may be freely set by the user of the control server 200, for example, in consideration of the characteristics of the rechargeable battery, for example.

In the case where the simulated result is improved more than the simulated result of the control plan before switching the state, the update unit 233d updates the control plan to the control plan after switching the state. For example, the update unit 233d is a processing unit that updates the control plan to the control plan after switching the state on the first control plan table 225 in the case where the simulated result is improved more than the simulated result of the control plan before switching the state.

For example, the update unit 233d finds the peak electric power from the simulated result. The update unit 233d acquires the power used amount in the individual time zones by the present time instant in a day as actual measurement values. The update unit 233d acquires the power used amount in the individual time zones after the present time instant in a day from the simulated result. The update unit 233d calculates the maximum value in the acquired power used amount as the peak electric power. The update unit 233d compares the calculated peak electric power with the peak electric power calculated from the simulated result of the control plan before switching the state. The update unit 233d updates the control plan to the control plan after switching the state in the case where the peak electric power is lower than the peak electric power calculated from the simulated result of the control plan before switching the state.

The executing unit 233e determines whether a predetermined termination condition is satisfied. For example, the executing unit 233e determines whether five minutes elapse after the creating unit 233 starts processing. In the case where five minutes do not elapse, the executing unit 233e repeatedly performs the processes of the generating unit 233b, the simulating unit 233c, and the update unit 233d. It is noted that here, the case is described where the termination condition is that five minutes elapse. However, the condition is not limited thereto. For example, such a configuration may be possible in which the termination condition is a given time period, or a given number of repetitions.

On the other hand, in the case where five minutes elapse, the executing unit 233e outputs information about the updated first control plan table 225 to the control plan determining unit 234.

The control plan determining unit 234 is a processing unit that generates a control plan individually for the notebook PCs 30 based on the first control plan table 225 and registers information about the generated control plan for the individual notebook PCs 30 on the second control plan table 226. The control plan determining unit 234 outputs information about the second control plan table 226 to the output unit 236.

The control plan determining unit 234 sets the states of individual time zone set to a group to the maximum value at which the notebook PCs in the group can consume power. For example, the number of the notebook PCs of the individual group is four. In this case, the power used amount in the state "AC" is 10×4 W, for example. Moreover, the electric power value in the state "BA" is 0×4 W, for example. Furthermore, the electric power value in the state "CH" is 60×4 W, for example. The control plan determining unit 234 adds the maximum value of electric power that can be consumed in the individual time zone to the constraints, similarly solves an optimization problem as the creating unit 233, and generates a control plan for the notebook PCs included in a group.

For example, in the case where the first control plan table 225 is as illustrated in FIG. 20, the constraints added to the notebook PCs 30 included in group 3A are as follows. Namely, the maximum value of electric power that can be consumed in the time zones "from 9:00 to 11:30" is "40 W", and the maximum value of electric power that can be consumed in the time zone "11:30 to 12:30" is "240 W". Moreover, the maximum value of electric power that can be consumed in the time zones "from 12:30 to 13:30" is "0 W".

The output unit 236 outputs data on the second control plan table to the notebook PC 30 of interest. The output unit 236 receives data on the second control plan table from the control plan determining unit 234.

Figure 26:
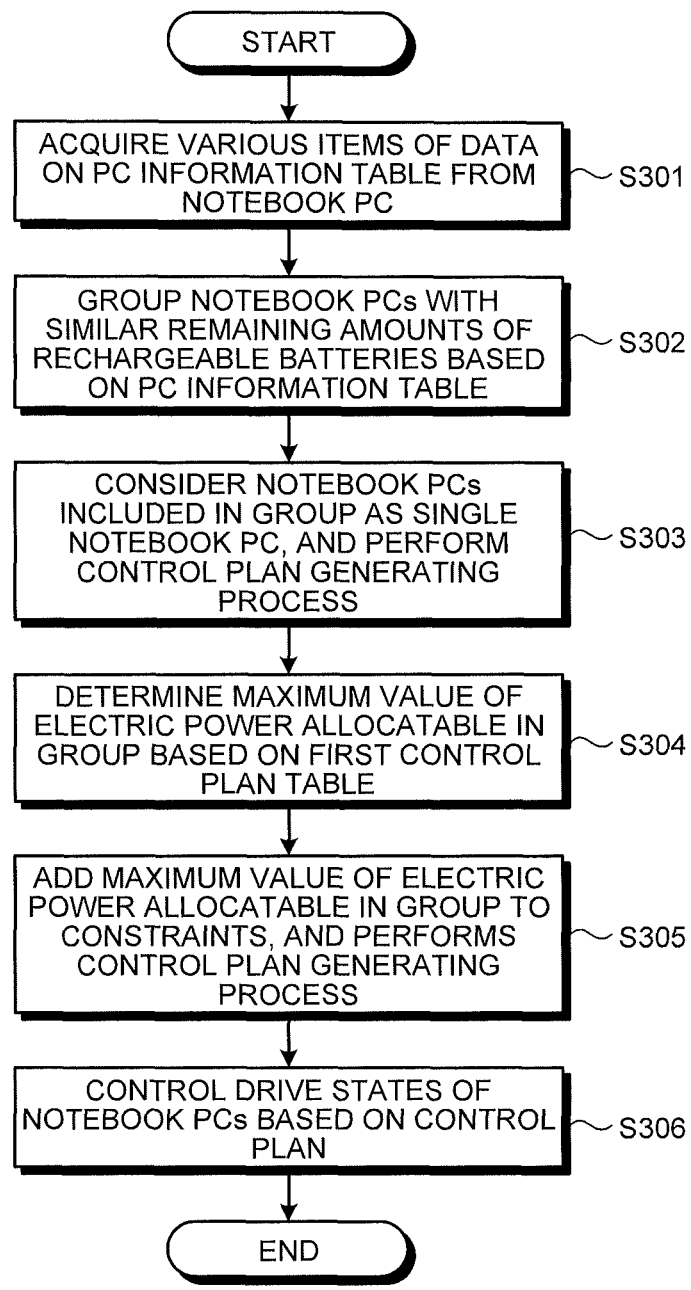
FIG. 26 is a flowchart of process procedures performed by the control server according to the second embodiment.

Next, the processes of the control server 200 according to the second embodiment will be described. FIG. 26 is a flowchart of process procedures performed by the control server according to the second embodiment. For example, the processes illustrated in FIG. 26 are performed at predetermined time intervals.

As illustrated in FIG. 26, the control server 200 acquires various items of data on the PC information table 222 from the notebook PC 30 (Step S301). The control server 200 groups the notebook PCs with similar remaining energy of the rechargeable batteries based on the PC information table 222 (Step S302).

The control server 200 considers a plurality of the notebook PCs 30 included in a group as a single notebook PC, and performs the control plan generating process (Step S303). The first control plan table 225 is generated in the process in Step S303.

The control server 200 determines the maximum value of electric power allocatable in a group based on the first control plan table 225 (Step S304). The control server 200 adds the maximum value of electric power allocatable in a group to the constraints, and performs the control plan generating process (Step S305). The second control plan table 226 is generated in the process in Step S305.

The control server 200 then controls the drive states of the notebook PCs based on the control plan (Step S306).

Next, the effect of the control server 200 according to the second embodiment will be described. The control server 200 groups the notebook PCs with similar remaining energy of the rechargeable batteries based on the remaining energy of the rechargeable batteries of the notebook PCs 30, and generates a control plan as the control server 200 considers the grouped notebook PCs as a single notebook PC. Thus, processes for local search in the case where a control plan is generated can be executed as a group is considered as a single device, and a plan nearly the optimum plan can be generated in a fewer processes.

Moreover, the control server 200 determines electric power in the individual time zones that is usable in a group based on the states allocated to the individual time zones in the control plan for a group, and determines a control plan for the notebook PCs 30 in the group. Thus, a control plan is generated for a group, and then a control plan can be generated for a fewer number of notebook PCs included in the group, so that processing loads can be reduced.

Figure 27:
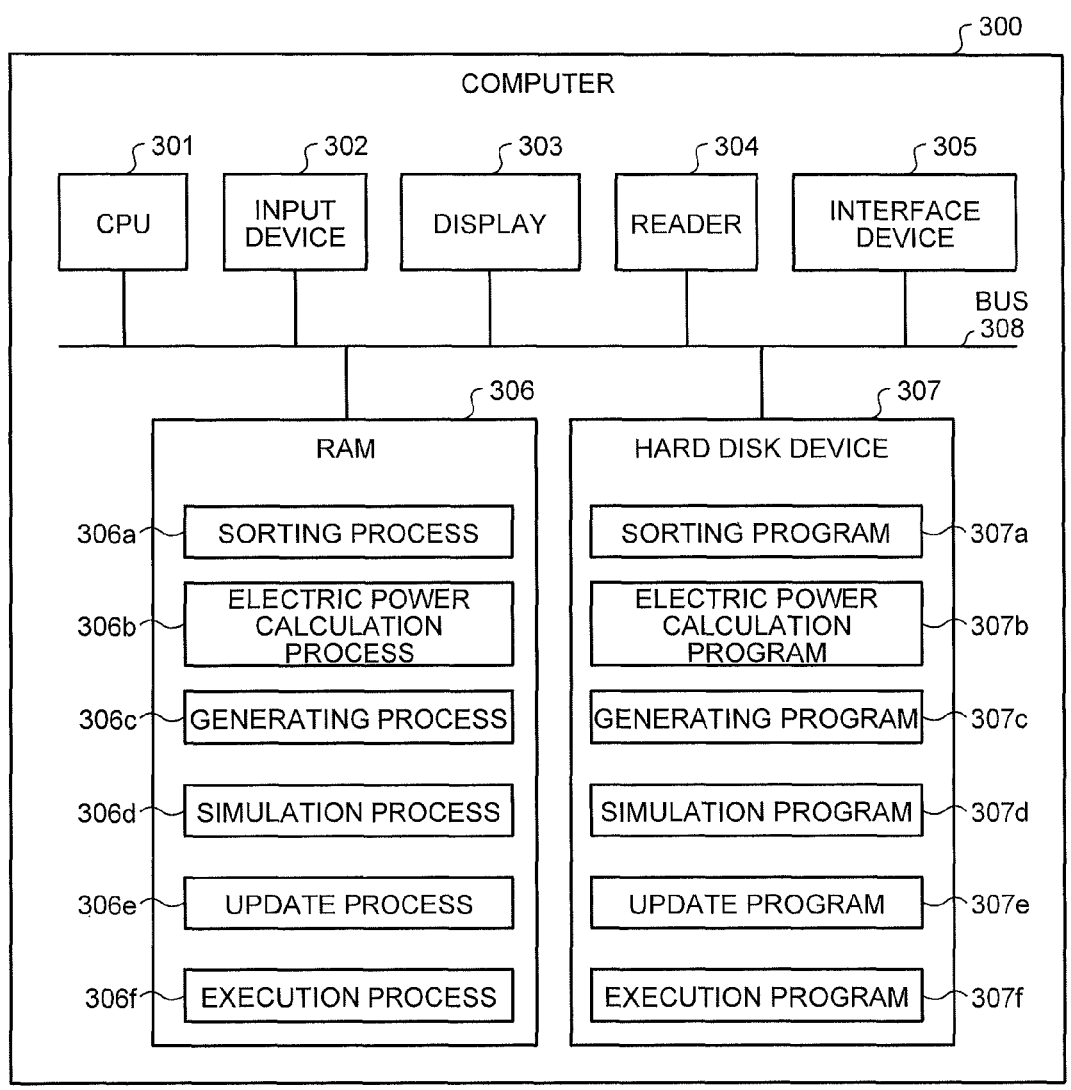
FIG. 27 is a diagram of an exemplary computer that executes a control program.

Next, an exemplary computer that executes a control program to implement functions similar to the functions of the control servers 100 and 200 shown in the embodiments will be described. FIG. 27 is a diagram of an exemplary computer that executes a control program.

As illustrated in FIG. 27, a computer 300 includes a CPU 301 that performs various arithmetic operation processes, an input device 302 that receives data input from a user, and a display 303. Moreover, the computer 300 includes a reader 304 that reads a program, for example, out of a storage medium, and an interface device 305 that receives and sends data with a different computer via a network. Furthermore, the computer 300 includes RAM 306 that temporarily stores various items of information and a hard disk device 307. The devices 301 to 307 are then connected to a bus 308.

For example, the hard disk device 307 includes a sorting program 307a, an electric power calculation program 307b, a generating program 307c, a simulation program 307d, an update program 307e, and an execution program 307f. The CPU 301 reads and expands the programs 307a to 307f on the RAM 306.

The sorting program 307a functions as a sorting process 306a. The electric power calculation program 307b functions as an electric power calculation process 306b. The generating program 307c functions as a generating process 306c. The simulation program 307d functions as a simulation process 306d. The update program 307e functions as an update process 306e. The execution program 307f functions as an execution process 306f.

For example, the sorting process 306a corresponds to the sorting unit 133a. The electric power calculation process 306b corresponds to the power calculating unit 133b. The generating process 306c corresponds to the generating unit 133c. The simulation process 306d corresponds to the simulating unit 133d. The update process 306e corresponds to the update unit 133e. The execution process 306f corresponds to the executing unit 133f.

It is noted that the programs 307a to 307f are not necessarily initially stored on the hard disk device 307. For example, the programs are stored on "a portable physical medium" such as a flexible disk (FD), a CD-ROM, a DVD disk, a magneto-optical disk, and an IC card, which are inserted into the computer 300. Such a configuration may be possible in which the computer 300 reads the programs 307a to 307f out of the media and executes the programs 307a to 307.

According to an aspect of the present invention, such an effect is exerted that charging and discharging plans can be created with less processing time.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method executed by a computer, the method causing the computer to execute the processes of:
sorting a plurality of devices into a plurality of groups based on remaining energy of rechargeable batteries included in the plurality of devices;
generating a virtual control plan for the plurality of groups, by changing a state in a control plan which specifies a respective state of each device in each time zone, the state indicating whether the device charges or discharges the rechargeable batteries;
simulating an electric power demand for the each time zone using the virtual control plan, for the plurality of groups;
updating the control plan to the virtual control plan when a simulated result is improved more than a simulated result of the control plan, for the plurality of groups, wherein the updating determines that the simulated result is improved when a peak electric power of the virtual control plan is lower than a peak electric power of the control plan;
outputting the control plan when a termination condition whether a predetermined time elapses is satisfied; and updating the control plan repeatedly until the termination condition is satisfied when the termination condition is not satisfied.

2. The control method according to claim 1, wherein the sorting sorts the plurality of devices into the plurality of groups based on remaining energy of rechargeable batteries included in the plurality of devices so a distribution of remaining energy of rechargeable batteries of a plurality of devices included in a group is equal to a distribution of remaining energy of rechargeable batteries of a plurality of devices included in a different group.

3. The control method according to claim 2, the method causing the computer further to execute the process of:
calculating electric power allocated to the plurality of groups by dividing a total of electric power allocated to the plurality of devices by a number of the groups, wherein
the updating updates the control plan to the virtual control plan when a simulated result is improved more than a simulated result of the control plan and electric power of the virtual control plan does not exceed the electric power allocated to the plurality of groups.

4. The control method according to claim 1, wherein the sorting sorts the plurality of devices in accordance with a remaining energy of each rechargeable battery, of the rechargeable batteries, by grouping the plurality of devices in a descending order of the remaining energy of the rechargeable battery into a plurality of groups of a predetermined number of devices and the generating generates the virtual control plan that a state of a part of devices is switched with respect to a control plan specifying a charging state and a discharging state on the each time zone for the devices by considering a plurality of devices included in the plurality of groups as a single device and a total value of capacitances of rechargeable batteries of a plurality of devices included in the plurality of groups as a capacitance of a rechargeable battery of a single device.

5. The control method according to claim 4, the method causing the computer further to execute the process of determining electric power in the each time zone that is usable in the plurality of groups based on the respective state allocated to the each device in the each time zone in a control plan by considering a plurality of devices included in the plurality of groups as a single device and determining a control plan for the devices in the plurality of groups.

6. A control server comprising:
a memory; and
a processor coupled to the memory, wherein the processor executes a process comprising:
sorting a plurality of devices into a plurality of groups based on remaining energy of rechargeable batteries included in the plurality of devices;
generating a virtual control plan for the plurality of groups, by changing a state in a control plan which specifies a respective state of each device in each time zone, the state indicating whether the device charges or discharges rechargeable batteries;
simulating an electric power demand for the each time zone using the virtual control plan, for the plurality of groups;
updating the control plan to the virtual control plan when a simulated result is improved more than a simulated result of the control plan, for the plurality of groups, wherein the updating determines that the simulated result is improved when a peak electric power of the virtual control plan is lower than a peak electric power of the control plan;
outputting the control plan when a termination condition whether a predetermined time elapses is satisfied; and
updating the control plan repeatedly until the termination condition is satisfied when the termination condition is not satisfied.

7. The control server according to claim 6, wherein the sorting sorts the plurality of devices into the plurality of groups based on remaining energy of rechargeable batteries included in the plurality of devices so a distribution of remaining energy of rechargeable batteries of a plurality of devices included in a group is equal to a distribution of remaining energy of rechargeable batteries of a plurality of devices included in a different group.

8. The control server according to claim 7, wherein the process further comprises calculating electric power allocated to the plurality of groups by dividing a total of electric power allocated to the plurality of devices by a number of the groups and the updating updates the control plan to the virtual control plan when a simulated result is improved more than a simulated result of the control plan and electric power of the virtual control plan does not exceed the electric power allocated to the plurality of groups.

9. The control server according to claim 6, wherein the sorting sorts the plurality of devices in accordance with a remaining energy of each rechargeable battery, of the rechargeable batteries, by grouping the plurality of devices in a descending order of the remaining energy of the rechargeable battery into a plurality of groups of a predetermined number of devices and the generating generates the virtual control plan that a state of a part of devices is switched with respect to a control plan specifying a charging state and a discharging state on the each time zone for the devices by considering a plurality of devices included in the plurality of groups as a single device and a total value of capacitances of rechargeable batteries of a plurality of devices included in the plurality of groups as a capacitance of a rechargeable battery of a single device.

10. The control server according to claim 9, wherein the process further comprises determining electric power in the each time zone that is usable in the plurality of groups based on the respective state allocated to the each device in the each time zone in a control plan by considering a plurality of devices included in the plurality of groups as a single device and determining a control plan for the devices in the plurality of groups.

11. A non-transitory computer-readable recording medium having stored therein a control program that causes a computer to execute a process comprising:
sorting a plurality of devices into a plurality of groups based on remaining energy of rechargeable batteries included in the plurality of devices;
generating a virtual control plan for the plurality of groups, by changing a state in a control plan which specifies a respective state of each device in each time zone, the state indicating whether the device charges or discharges rechargeable batteries;
simulating an electric power demand for the each time zone using the virtual control plan, for the plurality of groups;
updating the control plan to the virtual control plan when a simulated result is improved more than a simulated result of the control plan, for the plurality of groups, wherein the updating determines that the simulated result is improved when a peak electric power of the virtual control plan is lower than a peak electric power of the control plan;

outputting the control plan when a termination condition whether a predetermined time elapses is satisfied; and
updating the control plan repeatedly until the termination condition is satisfied when the termination condition is not satisfied.

12. The non-transitory computer-readable recording medium according to claim 11, wherein the sorting sorts the plurality of devices into the plurality of groups based on remaining energy of the rechargeable batteries included in the plurality of devices so a distribution of remaining energy of rechargeable batteries of a plurality of devices included in a group is equal to a distribution of remaining energy of rechargeable batteries of a plurality of devices included in a different group.

13. The non-transitory computer-readable recording medium according to claim 12, wherein the process further comprises calculating electric power allocated to the plurality of groups by dividing a total of electric power allocated to the plurality of devices by a number of the groups and the updating updates the control plan to the virtual control plan when a simulated result is improved more than a simulated result of the control plan and electric power of the virtual control plan does not exceed the electric power allocated to the plurality of groups.

14. The non-transitory computer-readable recording medium according to claim 11, wherein the sorting sorts the plurality of devices in accordance with a remaining energy of each rechargeable battery, of the rechargeable batteries, by grouping the plurality of devices in a descending order of the remaining energy of the rechargeable battery into a plurality of groups of a predetermined number of devices and the generating generates the virtual control plan that a state of a part of devices is switched with respect to a control plan specifying a charging state and a discharging state on the each time zone for the devices by considering a plurality of devices included in the plurality of groups as a single device and a total value of capacitances of rechargeable batteries of a plurality of devices included in the plurality of groups as a capacitance of a rechargeable battery of a single device.

15. The non-transitory computer-readable recording medium according to claim 14, wherein the process further comprises determining electric power in the each time zone that is usable in the plurality of groups based on the respective state allocated to the each device in the each time zone in a control plan by considering a plurality of devices included in the plurality of groups as a single device and determining a control plan for the devices in the plurality of groups.

* * * * *